United States Patent
Atkins et al.

(10) Patent No.: US 9,319,652 B2
(45) Date of Patent: Apr. 19, 2016

(54) METHOD AND APPARATUS FOR MANAGING DISPLAY LIMITATIONS IN COLOR GRADING AND CONTENT APPROVAL

(75) Inventors: Robin Atkins, Campbell, CA (US); Chun C. Wan, Mountain View, CA (US); Anne Webster, Vancouver (CA)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 13/989,736

(22) PCT Filed: Nov. 16, 2011

(86) PCT No.: PCT/US2011/061071
§ 371 (c)(1),
(2), (4) Date: May 24, 2013

(87) PCT Pub. No.: WO2012/082294
PCT Pub. Date: Jun. 21, 2012

(65) Prior Publication Data
US 2013/0258203 A1    Oct. 3, 2013

Related U.S. Application Data

(60) Provisional application No. 61/422,208, filed on Dec. 12, 2010.

(51) Int. Cl.
*H04N 9/64*    (2006.01)
*G09G 5/02*    (2006.01)
(Continued)

(52) U.S. Cl.
CPC .. *H04N 9/64* (2013.01); *G09G 5/02* (2013.01); *G11B 27/034* (2013.01);
(Continued)

(58) Field of Classification Search
CPC ........... H04N 9/646; H04N 9/64; H04N 9/68; H04N 9/67; H04N 9/73
USPC ........................................ 348/642, 650, 708
See application file for complete search history.

(56) References Cited

U.S. PATENT DOCUMENTS 6,016,167 A    1/2000  Brett
6,972,828 B2   12/2005  Bogdanowicz
(Continued)

FOREIGN PATENT DOCUMENTS

JP    2002-344761    11/2002
JP    2007-121841    5/2007
(Continued)

OTHER PUBLICATIONS

Specification ICC.1:2004-10 (Profile version 4.2.0.0), Internet citation, May 22, 2006; retrieved from the Internet: URL:http://www.color.org.

*Primary Examiner* — Jefferey Harold
*Assistant Examiner* — Omer Khalid

(57) ABSTRACT

Methods and apparatus are provided for ensuring consistency in the appearance of video data displayed on displays having different capabilities than a target display. Some embodiments comprising modifying at least one pixel of input video data such that the modified pixel represents the appearance of the at least one pixel when displayed by a target display. In some embodiments, modifying the at least one pixel comprises replacing an original pixel value of the at least one pixel with a replacement pixel value representing a modeled display of the original pixel value by the target display.

8 Claims, 11 Drawing Sheets

(51) Int. Cl.
  H04N 1/60 (2006.01)
  H04N 5/225 (2006.01)
  H04N 9/04 (2006.01)
  G11B 27/034 (2006.01)
  H04N 9/73 (2006.01)
  H04N 9/68 (2006.01)
  H04N 9/67 (2006.01)

(52) U.S. Cl.
  CPC .......... H04N 1/6052 (2013.01); H04N 5/2256 (2013.01); H04N 9/045 (2013.01); *G09G 2340/06* (2013.01); *H04N 9/67* (2013.01); H04N 9/68 (2013.01); H04N 9/73 (2013.01)

(56) References Cited

U.S. PATENT DOCUMENTS

| | | | |
|---|---|---|---|
| 7,053,927 | B2 | 5/2006 | Jones |
| 7,453,454 | B2 | 11/2008 | Allen |
| 2005/0134801 | A1 | 6/2005 | Bogdanowicz |
| 2006/0007406 | A1* | 1/2006 | Adkins ............... G03B 21/13 353/82 |
| 2006/0232599 | A1 | 10/2006 | Lin |
| 2007/0268411 | A1 | 11/2007 | Rehm |
| 2007/0291179 | A1 | 12/2007 | Sterling |
| 2008/0195977 | A1 | 8/2008 | Carroll |
| 2009/0102968 | A1 | 4/2009 | Doser |

FOREIGN PATENT DOCUMENTS

| | | |
|---|---|---|
| JP | 2007-322850 | 12/2007 |
| JP | 2009-500654 | 1/2009 |
| JP | 2009-092732 | 4/2009 |
| JP | 2010-524024 | 7/2010 |
| WO | 2004/039085 | 5/2004 |
| WO | 2008/085150 | 7/2008 |

* cited by examiner

METHOD AND APPARATUS FOR MANAGING DISPLAY LIMITATIONS IN COLOR GRADING AND CONTENT APPROVAL

CROSS-REFERENCE TO RELATED APPLICATIONS

This application claims priority to U.S. Provisional Patent Application No. 61/422,208 filed 12 Dec. 2010, which is incorporated herein by reference in its entirety.

TECHNICAL FIELD

The invention relates to methods and apparatus useful in color-grading, approving, distributing and viewing image data content, such as video content. Some embodiments provide methods and apparatus for adjusting video content for purposes of color-grading, approving and/or viewing video content.

BACKGROUND

Post-production of video content may include color grading. Color grading may involve using a color grading tool (e.g., a tool implemented in hardware and/or software) to enhance, correct and/or otherwise alter characteristics of video content for objective aims (e.g., matching colors as between video content captured under different conditions) and/or subjective aims (e.g., achieving a particular aesthetic). Color grading is sometimes performed by an individual (or a group of individuals) as an iterative process of applying color grading operations to video content and viewing the results thereof on a display. Because color grading may have a significant impact on the appearance of video content, it may be desirable that color-graded video content be approved before the video content is distributed to consumers and/or archived.

Characteristics of video displays used to display video content may affect how video content appears when displayed. For instance, the display of video content by a display may be affected by characteristics of the display such as the color gamut of the display, the primaries used by the display to generate color, the calibration parameters of the display, the luminance range of the display, and the like. For this reason, the same video content displayed on video displays having different characteristics may be perceived differently by the human visual system. Individuals who perform color grading and/or approve color-graded content may use reference displays having well-defined characteristics to ensure consistent and accurate video display.

In some instances, a reference display may be incapable of accurately displaying pixels having certain pixel values and/or combinations of pixel values that may be contained in video content. As a result, video content may include pixels having values that, because they cannot be properly displayed by the reference display, are not perceived by those performing color grading or approving color-graded content. When the video content is viewed on a display capable of accurately displaying pixels that could not be accurately displayed by the reference display, the video content may appear differently than it did on the reference display. It may occur that pixels that could not be accurately displayed on the reference display deleteriously affect the appearance of the video content when it is displayed on a display capable of accurately displaying those pixels.

There is accordingly a desire for methods and apparatus that mitigate the risk of displays of video content being deleteriously affected by the display of pixels not accurately perceived by originators of the video content.

SUMMARY

This invention has a range of aspects. These include without limitation, color timing apparatus; apparatus for production and/or distribution of video and/or still image data; methods for production of video and/or still image data; non-transitory media comprising computer readable instructions that, when executed, cause a processor to perform a method for production and/or distribution of video and/or still image data as described herein.

One example aspect provides a method for conforming video data to a fidelity range of a target display. The method comprises modifying at least one pixel of the video data such that the modified pixel represents, at least approximately, the appearance of the at least one pixel when displayed by the target display.

Another example aspect provides apparatus for distributing image data. The image data may comprise video and/or still image data. The apparatus comprises a display; a player connected to display the image data on the display; and, a display conformer. The display conformer is configured to: identify out-of-fidelity pixels in the image data having pixel values that are out of a fidelity range of the display; estimate displayed pixel values corresponding to the out-of-fidelity pixels as displayed on the display; and generate modified image data by replacing the pixel values for the out-of-fidelity pixels with the estimated displayed pixel values.

Further aspects of the invention and features of example embodiments of the invention are described below and illustrated in the accompanying drawings.

BRIEF DESCRIPTION OF THE DRAWINGS

The accompanying drawings show non-limiting example embodiments.

DESCRIPTION

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

Figure 1:
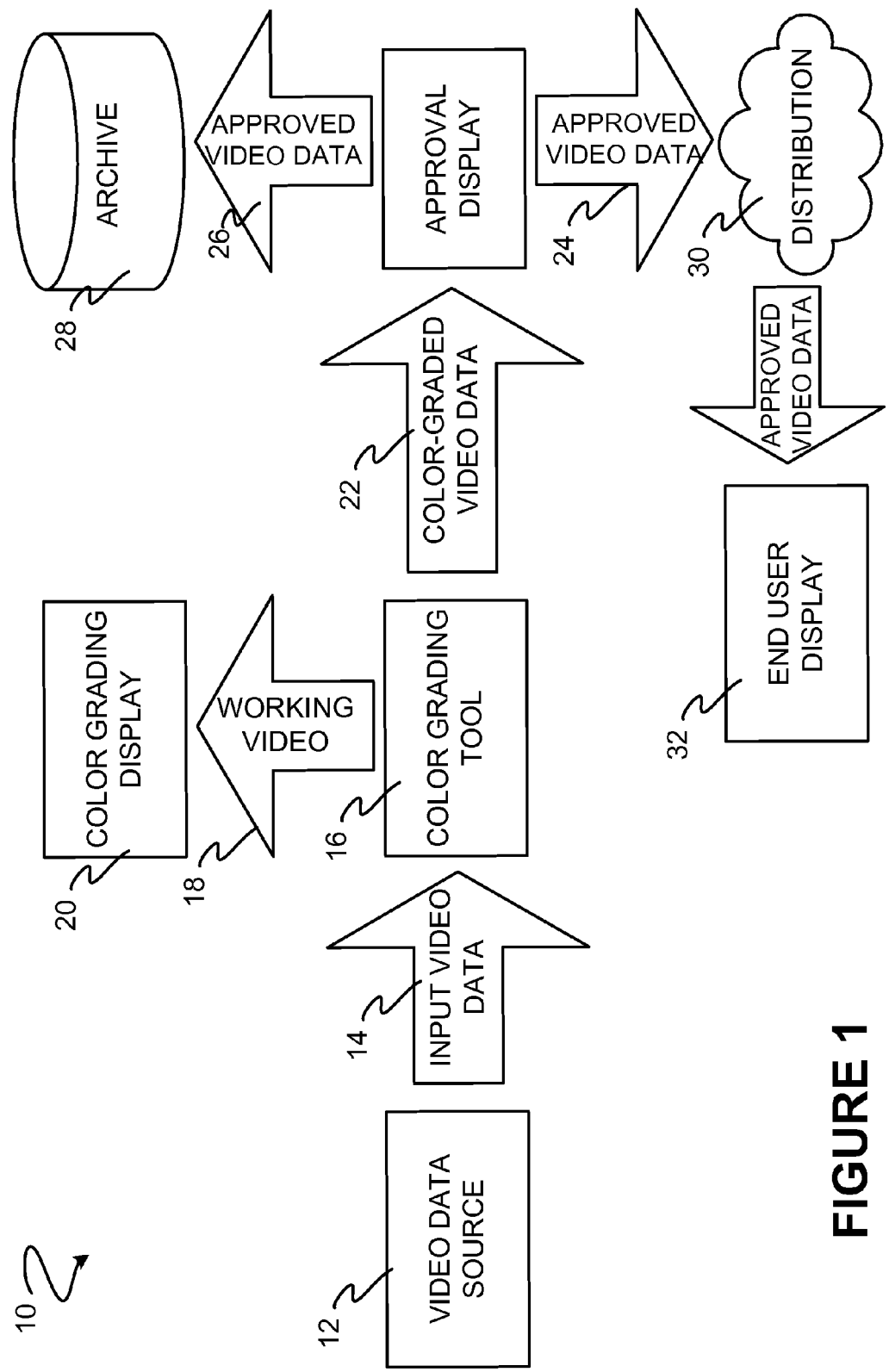
FIG. 1 is a block diagram of a video post-production work flow.

FIG. 1 is a block diagram illustrating an example video post-production and distribution work-flow 10. Input video data 14 from a video data source 12 is provided to a color grading tool 16. Color grading tool 16 is operable to enhance, correct and/or otherwise alter input video data 14, such as by modifying pixel values to change color, brightness, contrast, and the like. Working video data 18 of color grading tool 16 is provided to a color grading reference display 20. Color grading reference display 20 displays working video data 18.

A user of color grading tool 16 may view working video data 18 on reference display 20 to assess the effect of color grading operations on input video data 14. When color grading of input video data 14 is complete, color-graded video data 22 is provided to an approval reference display 24, where it may be viewed for approval. Color grading reference display 20 and approval reference display 24 may be the same display or different displays. After color-graded video data 22 is approved, approved video data 26 may be provided to an archive 28, a distribution network 30 and/or an end-user display 32.

In some embodiments, video data in workflow 10 (e.g., input video data 14, working video data 18, color-graded video data 22, and/or approved video data 26) may comprise video pixels that cannot be accurately displayed by some displays. Consider, for example, a video pixel specified with a single luminance coordinate and two chromaticity coordinates (e.g., in the Yu'v' color space). A display may be incapable of accurately displaying the video pixel if the pixel value for the luminance coordinate specifies a luminance that exceeds a maximum luminance that the display is capable of displaying. The display may also be incapable of accurately displaying the video pixel if the combination of pixel values for the chromaticity coordinates specifies a chromaticity outside the gamut that the display can accurately represent. Consider for another example, a video pixel specified in terms of a tuple of XYZ tristimulus values, which may take any values in a range broad enough to represent colors in a chromaticity gamut as large as the chromaticity gamut of the human visual system, in a luminance range of 0 to 104 cd/m2 for all chromaticities, and infinite contrast between adjacent pixels. A display may be incapable of accurately displaying the video pixel if the combination of XYZ tristimulus values specifies a luminance that is greater than a maximum luminance that the display is capable of displaying or if the combination of XYZ tristimulus values specifies a chromaticity outside the gamut that the display can accurately represent or if contrast between nearby pixels exceeds a spatial contrast limitation of the display.

For convenience, the term "pixel value" may be used herein to refer to the value of a pixel specified by a single value, one of the pixel values of a pixel specified by multiple pixel values, or a combination of two or more pixel values of a pixel specified by multiple values. Where a video pixel has a pixel value that cannot be displayed by a particular display, this may mean that the pixel value specifies a luminance and/or chromaticity that cannot be accurately rendered at the display pixel corresponding to the video pixel.

A video pixel that is displayed accurately by a display may be said to be within the "fidelity range" of the display. By definition, a video pixel that is outside the fidelity range of the display will not be displayed accurately by the display.

A video pixel may be outside the fidelity range of a display for one or more of a number of reasons. Displays comprise display elements (e.g., spatial light modulators (SLMs), such as liquid crystal display (LCD) panels, deformable mirror devices (DMDs), etc.; light emitters, such as cold cathode fluorescent light (CCFL) backlights, light emitting diodes (LEDs), plasma cells, phosphors, etc.; and the like). Displays produce images by controlling their display elements to emit and/or control light which corresponds to the values specified in video pixels. Video pixels may be inaccurately rendered because display elements are not controlled (e.g., as a result of image processing), or cannot be controlled (e.g., due to physical limitations of display elements that limit the luminance range and/or chromaticity gamut that can be achieved at pixels of the display), to emit light which accurately renders the values specified in the video pixels. For convenience, a property of a display which causes, directly or indirectly, a video pixel to be rendered inaccurately may be referred to herein as a "display limitation." It is to be appreciated that the terms "limitation" and "capability" may be used to refer to the same property (e.g., a luminance range or a chromaticity gamut).

Some display limitations apply uniformly to all pixels of the display. An example of this is the chromaticity gamut achievable by a uniformly illuminated LCD panel. Other display limitations differ among different display pixels, for example, due to how the display pixels are situated relative to other display elements of the display. Consider, for example, a display comprising a light emitter configured to provide non-spatially uniform illumination to a spatial light modulator. In such a display, some pixels of the spatial light modulator may be situated to receive relatively brighter light from the light emitter than other pixels. Those display pixels situated to receive relatively brighter light from the light emitter may have maximum and minimum luminance limits that are greater than the corresponding limits of the display pixels situated to receive relatively less bright light. A very bright white video pixel may be within the fidelity range of the display pixels situated to receive relatively brighter light, but outside the fidelity range of the display pixels situated to receive relatively less bright light.

For convenience, a display limitation that depends on the spatial location of the display pixel (e.g., relative to one or more display elements of the display) may be referred to as a spatially-dependent display limitation. Conversely, a display limitation that does not depend on the spatial location of the display pixel (e.g., relative to one or more display elements of the display) may be referred to as a spatially-independent display limitation.

In some displays, whether a display pixel can accurately display a video pixel (i.e., whether the video pixel is within the fidelity range of the display pixel) depends on the values of video pixels corresponding to one or more other display pixels. This may occur, for example, in displays where a single display element contributes to the appearance of more than one display pixel. Where this is the case, it may occur that accurately displaying one video pixel requires controlling the display element in a manner that causes another video pixel to be displayed inaccurately. Consider, for example, a display comprising a single, dimmable light emitter configured to illuminate a portion of a transmission type SLM (e.g., an LCD). In such a display, any two adjacent display pixels of the spatial light modulator will receive approximately the same level of illumination from the light emitter, regardless of the brightness of the light output by the light emitter. If each of the display pixels of the SLM is limited in the proportion of incident light it can block, and the video pixels corresponding to the display pixels specify, respectively, absolute black and maximally bright white, one or both of the video pixels will not be accurately displayed. Either the dimmable light source will drive to provide relatively low illumination so that the absolute black can be achieved, at the expense of displaying a less than maximally bright white, or the dimmable light source will be driven to a relatively high illumination so that the bright white can be achieved, at the expense of displaying a less than absolute black, or the dimmable light source will be driven to provide an intermediate level of illumination and neither the absolute black nor the maximally bright white will be achieved.

Another example of how the fidelity range of a display pixel may depend on the values of video pixels corresponding to one or more other display pixels is where a limited resource must be shared among display elements. Consider, for example, a display comprising an array of dimmable light emitters which draw power from a shared power supply having a limited capacity. In such a display, it may be the case that the power supply is unable to supply enough power to simultaneously drive all of the light emitters to their maximum. Where this is the case, and all substantially all video pixels specify relatively high luminance, the display may be unable to drive all of the light emitters to the level necessary to produce the specified luminance at the display pixels.

For convenience, a display property which causes the fidelity range of a display pixel to depend on the values of video pixels corresponding to one or more other display pixels may be referred to as a "content dependent display limitation". Conversely, a display property which limits fidelity range regardless of the values of video pixels corresponding to other display pixels may be referred to as a "content independent display limitation".

In some instances, a display may not be able to simultaneously accurately display a particular set of video pixels (e.g., due to a content dependent display limitation), even though the display may be capable of accurately displaying each of the video pixels separately (e.g., without exceeding a content independent display limitation). Both content dependent and content independent display limitations may be spatially dependent, such that for a particular video pixel, they depend on the location of the corresponding display pixel (e.g., a location relative to one or more display elements of the display).

It will be appreciated that a plurality of display limitations may potentially apply to define the fidelity range of a particular display pixel. Where this is the case, determining the fidelity range exactly for a display pixel may be computation or hardware intensive. Some embodiments apply approximations of display limitations to estimate a fidelity range. One such approximation involves applying a single spatially-independent display limitation for all display pixels in place of a spatially-dependent display limitation. For example, where the maximum luminance of a display is spatially-dependent, a single spatially-independent maximum luminance equal to the greatest luminance achievable by any pixel of the display may be applied globally to determine whether a video pixel cannot be displayed by the display. For convenience, a spatially-independent, content independent display limitation that is achievable by at least one display pixel, but not achievable by at least one other display pixel, may be described herein as "uncommonly attainable".

For another example, where the maximum luminance of a display is spatially-dependent, a single spatially-independent maximum luminance equal to the maximum luminance achievable by pixel having the least maximum luminance may be applied globally to determine whether any video pixel will violate the spatially-dependent limitation. For convenience, a spatially independent, content independent display limitation that is achievable by every display pixel may be described herein as "globally attainable".

Figure 2:
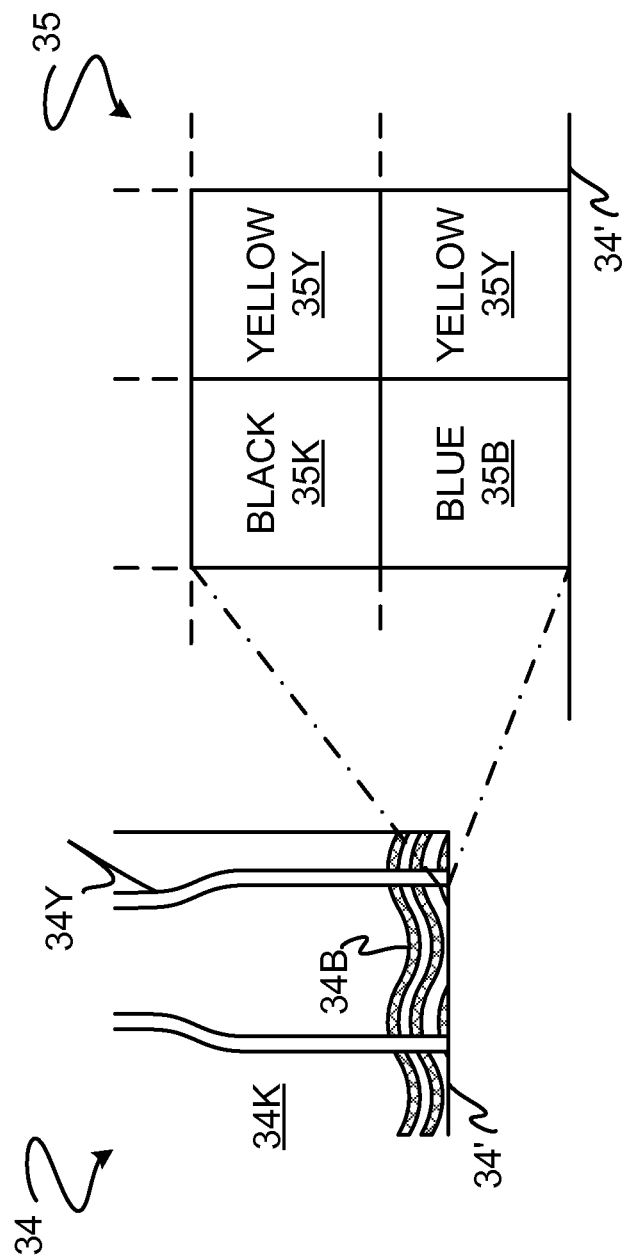
FIG. 2 is a schematic diagram of a video image and video pixels.
Figure 2A:
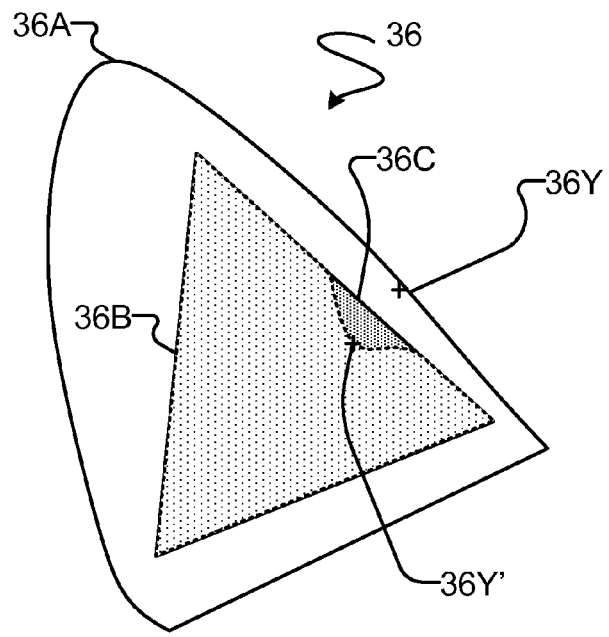
FIG. 2A is a schematic diagram of a plurality of color gamuts.
Figure 2B:
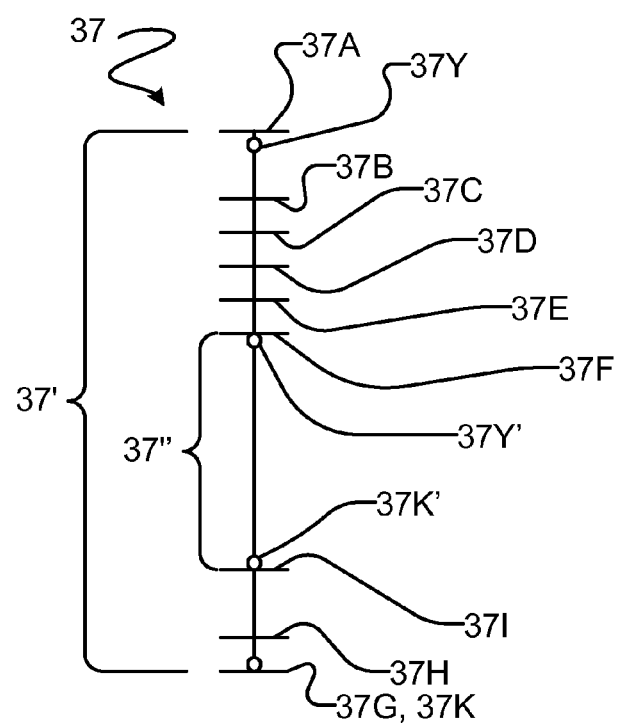
FIG. 2B is a schematic diagram of a luminance scale.

FIGS. 2, 2A and 2B provide a schematic illustration of how display limitations of an example dual modulator target display affect the appearance of an image 34 displayed on the display. The example target display to which the illustrations of FIGS. 2, 2A and 2B pertain comprises a spatial light modulator (SLM) (e.g., an LCD panel) having arrays of red, green, and blue SLM pixels (e.g., red, green and blue LCD pixels arranged in a tiled pattern). The SLM of the display is illuminated by an illumination source (e.g., a locally-dimmable LED backlight) comprising arrays of individually controllable red, green and blue light emitters (e.g., red, green and blue LEDs). The resolution of the illumination source light emitter arrays is less than the resolution of the SLM pixel array.

Video image 34 captures a night scene having a bright neon sign at its bottom right corner. The neon sign has a very bright, deeply saturated yellow feature 34Y that overlaps with a very bright, deeply saturated blue feature 34B. Features 34Y and 34B are on pure black background 34K. Pixel grid 35 shows four pixels of image 34 at edge 34'. Video pixels 35Y belong to feature 34Y and have pixel values that represent a very bright, deeply saturated yellow. Video pixel 35B belongs to feature 34B and has pixel values that represent a very bright, deeply saturated blue. Video pixel 35K belongs to background 34K and has pixel values that represent pure black.

In FIG. 2A, chromaticity diagram 36 illustrates a plurality of color gamuts, namely the gamut of chromaticities perceptible by the human visual system 36A, the globally attainable chromaticity gamut of the target display 36B, and a content dependent chromaticity gamut 36C for the SLM pixels corresponding to video pixels 35Y in the context of image 34. Color gamuts 36A-C are proportioned for illustrative purposes, and should not be interpreted as indicating actual chromaticity gamuts or relations between actual chromaticity gamuts.

Gamut 36B is triangular and encompassed by gamut 36A because the SLM and illumination source of the display are based on red, green and blue primaries. Because all pixels of the display are capable of displaying chromaticities inside of gamut 36B on a content independent basis, gamut 36B represents a content independent, globally attainable chromaticity limitation of the display. In the particular example display under consideration, gamut 36B is also the uncommonly attainable chromaticity gamut of the display (i.e., no pixel of the display is capable of displaying chromaticities outside of gamut 36B).

Gamut 36C has a cut-out in the yellow region because video pixel 35B, which neighbours pixels 35Y, has pixel values that represent a deeply saturated blue. To achieve this blue, the display illuminates the SLM pixel corresponding to video pixel 35B with light from a blue illumination source light emitter. Because the resolution of the illumination source light emitter arrays is less than the resolution of the SLM pixel arrays, blue light from the blue light emitter that illuminates the SLM pixel corresponding to pixel 35B also illuminates the SLM pixels corresponding to video pixels 35Y. Some of this blue light cannot be entirely blocked by the SLM pixels corresponding to video pixels 35Y. As a result, the display cannot display video pixels 35Y with exclusively red and green light (which in the RGB color scheme mix to yield yellow light), and thus cannot display video pixels 35Y as a "pure" saturated yellow. Because the display is incapable of displaying chromaticities outside of gamut 36C at SLM pixels corresponding to video pixels 35Y when image 34 is displayed, gamut 36C represents a content dependent, chromaticity difference limitation of the display.

Point 36Y indicates the chromaticity represented by the pixel values of pixels 35Y. Point 36Y is within gamut 36A, but outside of gamuts 36B and 36C. Since point 36Y is outside of gamut 36B, the display cannot accurately display the chromaticity indicated by point 36Y at any of the display's SLM pixels, and the nearest chromaticity that can be displayed is indicated by point 36Y'. But since point 36Y' is outside of gamut 36C (which is specific to the SLM pixels corresponding to video pixels 35Y and the pixel values of image 34) the display cannot accurately display the chromaticity indicated by point 36Y' at the SLM pixels corresponding to video pixels 35Y when displaying image 34. Instead, the display displays video pixels 35Y with the substitute chromaticity indicated by point 36Y". Point 36Y" is located at a boundary of gamut 36C. The chromaticity indicated by point 36Y" is different than the chromaticity indicated by point 36Y.

In FIG. 2B, luminance diagram 37 illustrates a plurality of luminance limits 37A-H along a luminance scale 37'. Luminance scale 37' is proportioned for illustrative purposes, and should not be interpreted as indicating actual luminances of luminance limits or relations among luminance limits. Luminance limits 37A-H may be understood as follows:

Luminance limit 37A indicates the maximum luminance perceptible by the human visual system under particular ambient illumination conditions; luminances greater than limit 37A are perceived by the human visual system the same as the luminance at limit 37A.

Luminance limit 37B indicates an uncommonly attainable maximum luminance limit of the display. In the context of the example display, it is the luminance of light emitted from the brightest display pixel (e.g., the SLM pixel located to receive the greatest intensity light from the illumination source light emitters) when the illumination source light emitters are driven to generate the maximum intensity illumination at the brightest pixel and the brightest SLM pixel is driven to be maximally transmissive of light.

Luminance limit 37C indicates a content dependent aggregate maximum luminance limit of the display for video image 34. Since the limited power budget of the display must be shared among the illumination source light emitters, the pixels of video image 34 must 'share' the limited aggregate luminance that can be output by the display. As a result, the maximum luminance that the display can achieve for any one pixel of video image 34 may be limited.

Luminance limit 37D indicates a content independent spatially-dependent maximum luminance limit of the display at the SLM pixels corresponding to pixels 35Y. Because the resolution of the illumination source light emitter arrays is less than the resolution of the SLM pixel arrays, some SLM pixels will be positioned to receive more light from the illumination source light emitter arrays than other SLM pixels (e.g., due to receiving light from relatively more light emitters or due to receiving relatively greater intensity light from particular light emitters). Since the SLM pixels corresponding to video pixels 35Y are located at the edge of the image, they will be displayed at SLM pixels near the display edge which receive light from relatively fewer light emitters (the display having few or no light emitters beyond its edge), and have a correspondingly lower content independent spatially-dependent maximum luminance limit.

Luminance limit 37E indicates a content dependent local-feature maximum luminance limit of the display for the SLM pixels corresponding to video pixels 35Y. Because video pixels 35Y neighbour video pixel 35K, whose pixel values represent pure black, the illumination source light emitters which illuminate the SLM pixels corresponding to video pixels 35Y cannot be driven too strongly, less too much light fall on the SLM pixel corresponding to video pixel 35K and cause video pixel 35K to appear too bright.

Luminance limit 37F indicates a content independent chromaticity-specific maximum luminance limit of the display for the chromaticity represented by point 36Y'. Since SLM pixels corresponding to video pixels 35Y must block at least some blue light (which is necessary to display video pixel 35B) in order to provide light having the chromaticity represented by point 36Y, this blocked light cannot contribute to the luminance of those SLM pixels.

Luminance limit 37G indicates a minimum luminance perceptible by the human visual system viewing the display under particular ambient illumination conditions (e.g., due to ambient light reflecting from the surface of the display); luminances less than limit 37G are perceived by the human visual system the same as the luminance at limit 37G.

Luminance limit 37H indicates a content dependent minimum luminance limit of the display. Because video image 34 contains a number bright features (not shown) distributed across it, the background level of illumination provided by the illumination source and the limited ability of the SLM pixels to block light results in a minimum luminance floor (black level), luminances below which cannot be achieved by any SLM pixel.

Luminance limit 37I indicates a content dependent local-feature minimum luminance limit of the display for the SLM pixel corresponding to video pixel 35K. Because video pixel 35K neighbours video pixels 35Y, whose pixel values represent bright, saturated yellow, the illumination source light emitters which are positioned to illuminate the SLM pixel corresponding to video pixel 35K cannot be driven too dimly, less too little light be provided to the SLM pixels corresponding to video pixels 35Y and cause video pixels 35Y to appear too dim.

As a result of the luminance limitations indicated by luminance limits 37A-I, the display is only capable of displaying video pixels 35Y with luminance of or less than luminance limit 37F (the least maximum luminance limit), and only capable of displaying video pixel 35K with luminance of or greater than luminance limit 37I (the greatest minimum luminance limit).

Point 37Y indicates the luminance represented by the pixel values of video pixels 35Y. The luminance at point 37Y is greater than the least maximum luminance limit of the display for the SLM pixels corresponding to video pixels 35Y, namely luminance limit 37F. Because the display cannot accurately display the luminance 37Y represented by the pixel values of video pixels 35Y, the display displays video pixels 35Y with the substitute luminance indicated by point 37Y'. Point 37Y' is located at the least maximum luminance limit 37F. The luminance indicated by point 37Y' is different than the luminance indicated by point 37Y.

Point 37K indicates the luminance represented by the pixel values of video pixel 35K. The luminance at point 37K is greater than the greatest minimum luminance limit of the display for the LCD pixel corresponding to video pixel 35K, namely luminance limit 37I. Because the display cannot accurately display the luminance 35K represented by the pixel values of video pixel 35K, the display displays video pixel 35K with the substitute luminance indicated by point 37K'. Point 37K' is located at the greatest minimum luminance limit 37I. The luminance indicated by point 37K' is different than the luminance indicated by point 37K.

The illustration of display limitations in FIGS. 2, 2A and 2B is not exhaustive. Other display limitations exist, and embodiments described herein may be adapted and/or applied to manage such other display limitations.

Where working video data 18 comprises pixels outside the fidelity range of display 20, color grading reference display 20 will not accurately display these pixels. For example, display 20 may display such pixels using substitute chromaticities and/or luminances. Pixels that are not accurately reflected in the appearance of working video data 18 on display 20 may differ perceptibly in appearance when viewed on other displays having fidelity ranges greater than the fidelity range of display 20. For example, another display having a fidelity range that includes the pixel values of pixels that were outside the fidelity range of display 20 may display these pixels accurately (i.e., with true, rather than substitute, chromaticities and luminances).

Inaccurate display of pixels on display 20 may lead to color-graded video data 22 containing pixels that cause color-graded video data 22 to appear differently than the color-grader intended when color-graded video data 22 is displayed on a display other than display 20. For example, where approval reference display 24 is able to accurately display some pixels contained in color-graded video data 22 that were outside the fidelity range of color-grading reference display 20, color-graded video data 22 may appear differently to a person viewing the video data for approval on display 24 than it did to the color-grader on display 20.

Similarly, color-graded video data 22 may comprise pixels that cannot be accurately displayed by approval reference display 24, and this may lead to color-graded video data 22 being approved when it contains pixels that cause color-graded video data 22 to appear differently when it is displayed on another display having a fidelity range greater than that of display 24. This creates a corresponding risk that the display of approved video data 26 on displays capable of accurately displaying these pixels will be perceptibly different in appearance than when viewed on reference display 24.

Figure 3:
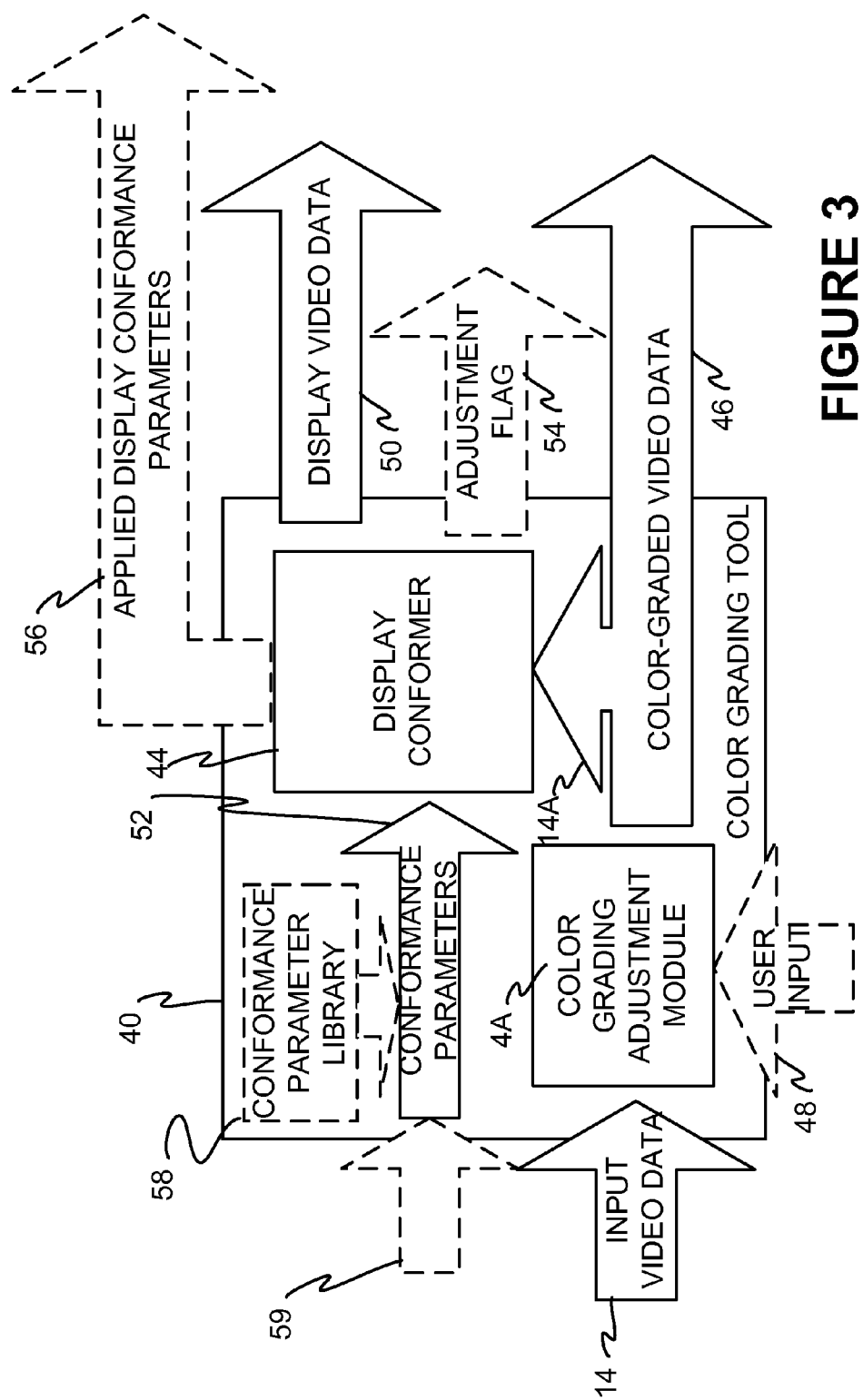
FIG. 3 is a block diagram of a color grading tool having a display conformer according to an example embodiment.

FIG. 3 is a block diagram of a color grading tool 40 according to an example embodiment. Color grading tool 40 may be implemented in hardware, a data processor programmed to execute software, a data processor programmed to execute firmware, or any suitable combination thereof. Color grading tool 40 comprises a color grading adjustment module 42 and a display conformer 44.

Color grading adjustment module 42 is configured to receive input video data 14. Color grading adjustment module 42 is operable to apply color-grading adjustments to input video data 14, thereby yielding color-graded video data 46. Color grading adjustment module 42 may be configured to apply a pre-determined set and/or sequence of color grading adjustments to input video data 14. In some embodiments, color grading adjustment module is configured to apply color grading adjustments in response to user input 48 (e.g., in response to input provided by an individual color grader). Color grading tool 40 may provide color grading functionality that is similar or identical to functionality provided by existing color grading tools. Color grading tool 40 may comprise components or modules of existing color grading tools, for example.

Display conformer 44 is configured to receive input video data 14A. In the illustrated embodiment, input video data 14A comprises color-graded video data 46. Display conformer 44 is operable to generate display video data 50 from input video data 14A by selectively modifying pixels of input video data 14A. Display conformer 44 may provide display video data 50 as a data stream (e.g., by communicating display video data 50 to another device, such as by over a network, or the like), or as fixed data (e.g., by committing display video data 50 to a data store, such as non-transitory writable media, a memory, a disk, or the like).

Where input video data 14A contains pixels outside the fidelity range of a target display (e.g., a display used by a color grader to view working video data), display conformer 44 is configured to generate display video data 50 by modifying at least some of the out-of-fidelity range pixels of input video data 14A such that the modified pixels in display video data 50 are at least nearer to the fidelity range of the target display (e.g., nearer to the fidelity range of the target display, or, preferably, within the fidelity range of the target display) than the out-of-fidelity range pixels in input video data 14A. Where input video data 14A comprises pixels that are outside the fidelity range of the target display, the differences (if any) in the appearance of display video data 50 when displayed by the target display and another display having a fidelity range greater than the target display will be less perceptible (if at all) than the differences in the appearance of input video data 14A when displayed by the target display and the other display.

In some embodiments, display conformer 44 comprises a pixel selector that determines whether or not pixel values in the input video data 14 are out of fidelity range for a target display and, if so, passes the selected pixels to a pixel value modification stage. Pixel values within the fidelity range of the target display may be passed through without modification.

In some embodiments, display conformer 44 is operable to generate display video data 50 from input video data 14A in real-time or near-real time (e.g., during color-grading). In some embodiments, display conformer 44 is operable to generate display video data 50 from pre-recorded input video data 14A.

In some embodiments, display conformer 44 is configured to modify at least some pixels of input video data 14A that are outside the fidelity range of a target display such that the modified pixels in display video data 50 are within the fidelity range of the target display. In such embodiments, display video data 50 generated by display conformer 44 will, as compared with input video data 14A, contain fewer or no pixels that cannot be accurately displayed by the target display. As a result, the differences (if any) in the appearance of display video data 50 when displayed by the target display and another display having a fidelity range greater than the target display will be less perceptible (if at all) than the differences in the appearance of input video data 14A when displayed by the target display and another display having a fidelity range greater than the target display.

In some embodiments, display conformer 44 is configured to modify at least some pixels of input video data 14A that are outside the fidelity range of a target display such that when display video data 50 is displayed by the target display, the modified pixels in display video data 50 appear at least substantially the same as their corresponding outside-fidelity-range pixels in input video data 14A appear when displayed by the target display. For example, display conformer 44 may be configured to modify pixels outside the fidelity range of a target display so that the modified pixels in display video data 50 represent, at least to a close approximation, the substitute chromaticities and/or luminances with which the target display displays the outside-fidelity range pixels. Where the modified pixels in display video data 50 represent substitute chromaticities and/or luminances displayed by the target display, these pixels are necessarily within the fidelity range of the target display.

Modification of pixels in this manner may be largely or entirely transparent to an individual performing color-grading using tool 40. Consider for instance a target display that displays pixels which specify out-of-gamut chromaticities with substitute in-gamut chromaticities. Where input video data 14A contains a pixel that specifies a chromaticity outside of the gamut of the target display, the target display will display the pixel with a substitute in-gamut chromaticity, which may be represented by a combination of pixel values in the fidelity range of the target display. Where display conformer 44 modifies the pixel representing the outside-of-gamut chromaticity so that its modified pixel values match the infidelity range combination of pixel values that represent the substitute in-gamut chromaticity, the post-modification pixel in display video data 50 and the pre-modification pixel in input video data 14A will both be displayed by the target display with the substitute in-gamut chromaticity.

Display conformer 44 may be configured to modify all or substantially all pixels in input content 14A that are outside the fidelity range of a target display so that the modified pixels in display video data 50 represent, at least approximately, the substitute chromaticities and/or luminances with which the target display displays the outside-fidelity range pixels. That is, display conformer 44 may be configured to generate display video data 50 such that all, or substantially all, pixels of input video data 14A which would be displayed by the target display with substitute chromaticities and/or luminances are, in display video data 50, specified with pixel values that represent, at least approximately, the substitute chromaticities and/or luminances. Where display conformer 44 is so configured, display video data 50 and input video data 14A will appear the same, or substantially the same, when displayed by the target display. Furthermore, when display video data 50 is displayed by another display having a fidelity range greater than the target display, display video data 50 when displayed on the other display will appear the same as, or substantially the same as, display video data 50 (or, equivalently input video data 14A) appears when displayed by the target display.

Where a pixel has a combination of pixel values that are outside a fidelity range of a target display, display conformer 44 may be configured to modify all or only some pixel values of the combination of pixel values. For example, where a combination of pixel values of a pixel specifies a chromaticity outside a color gamut of a target display, display conformer 44 may be configured to modify only one of the pixel values in order to bring the chromaticity of the modified pixel within the color gamut of the target display. Where a plurality of pixels are outside the fidelity range of a particular display due to a mutually interdependent content dependent display limitation (e.g., a spatial contrast limitation, a spatial chromaticity difference limitation), display conformer 44 may be configured to modify all or only some of the plurality of pixels. For example, where a plurality of adjacent pixels is outside of the fidelity range of a target display because the contrast ratio between the adjacent pixels exceeds a display limitation of the target display, display conformer 44 may be configured to modify one or more pixel values of only one of the adjacent pixels.

In some embodiments, display conformer 44 is optionally configured to modify pixels that can be accurately displayed by a target display. For example, display conformer 44 may be configured to modify pixels that can be accurately displayed by a target display where such modification is part of a scheme for modifying pixels that are outside the fidelity range of a target display (e.g., in compressing a first luminance range that straddles a luminance range limit to fit into a second luminance range within the luminance range, in compressing a first space of colors that straddles a gamut boundary to fit into a second space of colors within the gamut, etc.).

In some embodiments, display conformer 44 is configured to generate display video data 50 by modeling the display of input video data 14A by the target display, and modifying pixels so that display video data 50 represents, at least approximately, the chromaticities and/or luminances determined by the model. For example, display conformer 44 may be configured to apply input video data 14A to a computational display model of a target display, which display model is configured to:

determine, at least approximately, substitute chromaticities and/or luminances with which the target display would display pixels in input video data 14A that are outside the fidelity range of the target display; and determine pixel values that represent the determined substitute chromaticities and/or luminances.

It will be appreciated that the above operations may be combined. For example, display conformer 44 may be configured to apply a computable function or use a lookup table to map pixel values from input data 14A to output pixel values that represent previously determined substitute chromaticities and/or luminances.

In some embodiments, display conformer 44 is configured to determine, at least approximately, substitute chromaticities and/or luminances with which the target display would display pixels in input video data 14A using a model of a target display. The model may be configured to take input video data 14A or pixel values from input video data 14A and produce an output comprising pixel values that are estimates of the actual appearance of the target display when input video data 14A is reproduced on the target display. The model may comprise software instructions executed on a data processor that cause the data processor to compute the output of the model and/or configurable or hard-wired logic circuits.

Figure 4:
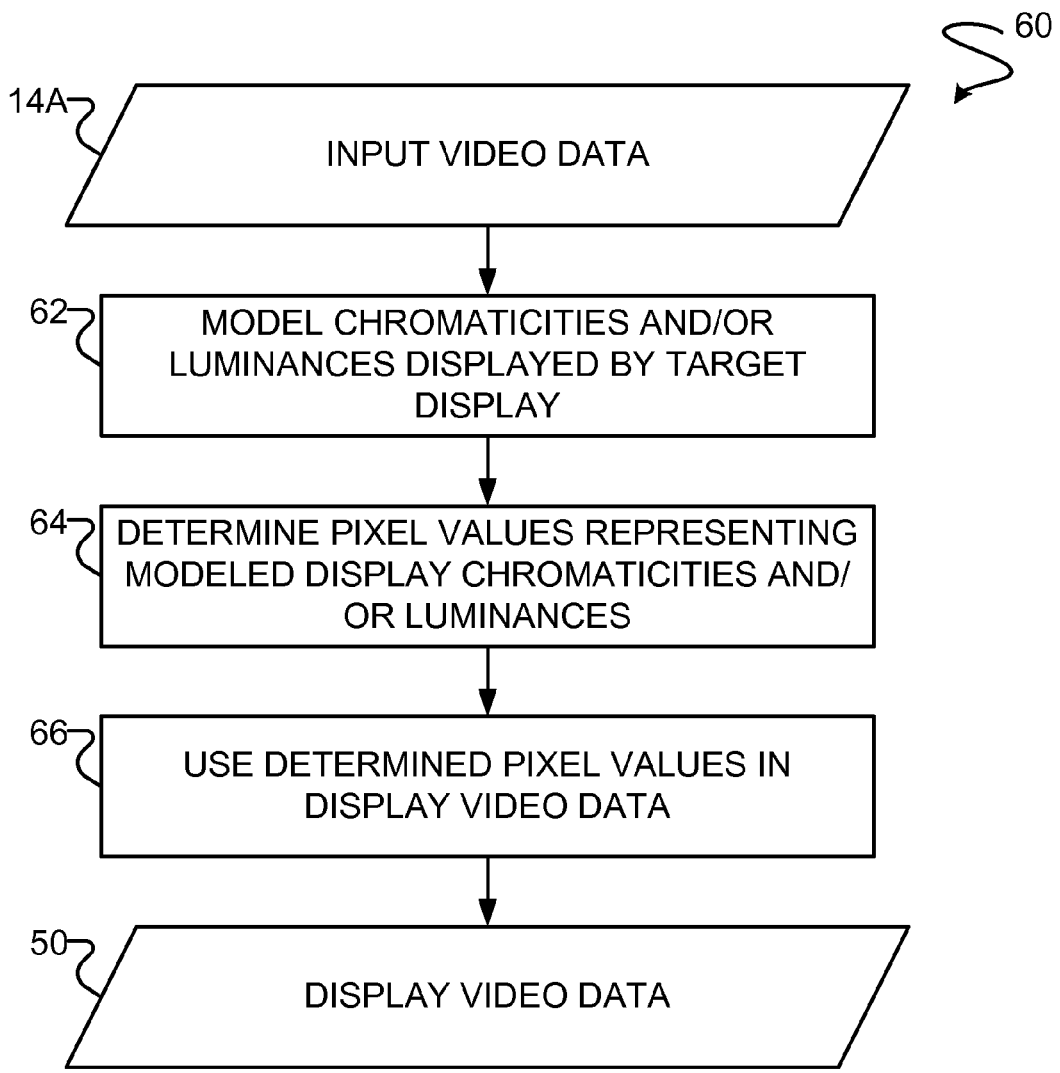
FIG. 4 is a flowchart of a method for conforming video data which a display conformer may implement.

FIG. 4 shows a flowchart of a method 60 which display conformer 44 may implement for generating display video data 50. Step 62 models the chromaticities and/or luminances with which a target display would display input video data 14A. Where the target display would display substitute chromaticities and/or luminances for pixels outside the fidelity range of the target display, step 62 determines modeled display chromaticities and/or luminances that at least approximate the substitute chromaticities and/or luminances. The model used in step 62 may comprise applying input one or more lookup tables, computable functions, combinations of these, or the like.

Step 64 determines pixel values representing the modeled display chromaticities and/or luminances. Step 66 uses the determined pixel values for pixels in output display video data 50.

Figure 5:
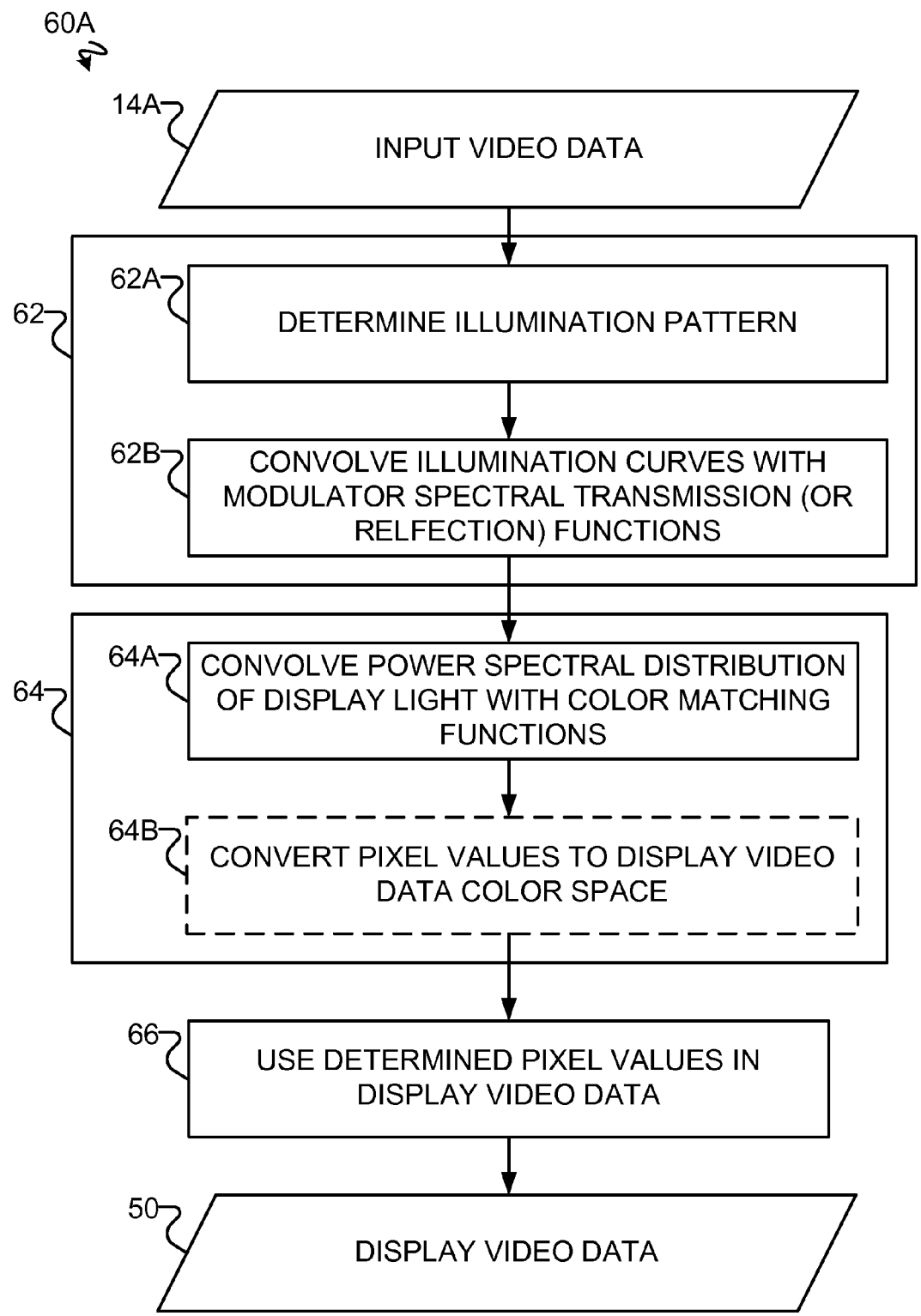
FIG. 5 is a flowchart of a method for conforming video data which a display conformer may implement.

FIG. 5 shows a flowchart of a method 60A which display conformer 44 may implement for generating display video data 50 corresponding to a target display having an illumination source and an SLM configured to modulate light from the illumination source. Method 60A comprises the steps of method 60. In method 60A, step 62 comprises steps 62A and 62B. Step 62A determines spectral power distribution curves indicative of the light generated by the illumination source of the target display at the pixels of the SLM. Step 62A may comprise, for example, convolving spectral power distribution curves representing the emission spectra of illumination elements with point spread functions indicative of the light intensity produced by the illumination elements at the SLM for driving values corresponding to input data 14A.

In some embodiments, step 62A may comprises additively combining different spectral power distribution curves for light at the SLM. For example, step 62A may comprise additively combining spectral distribution curves corresponding to light from different light emitters (e.g., where different illumination elements illuminate the same pixel). In some embodiments, step 62A may comprise additively combining spectral distribution curves corresponding to light from light emitters which emit different spectra of light (e.g., where the illumination source produces colored light using a plurality of spectrally distinct primaries). In some embodiments, step 62A may be performed at a spatial resolution that is less than the spatial resolution of the SLM, and the same spectral power distribution curve(s) used for two or more pixels (e.g., a single spectral power distribution curve may be modeled for each of a plurality of mutually-exclusive groups of modulator pixels).

Step 62B determines power spectral distribution curves for light that has been modulated by the SLM by convolving the power distribution curves of light generated by the illumination source of the target display at the SLM with spectral transmission (or reflectance) functions of pixels of the SLM. In step 62B, attenuation of incident light by the SLM may be accounted for by scaling one or more of: the power distribution curves of light incident on the SLM, the spectral transmission (or reflectance) functions of pixels of the SLM, and the power spectral distribution curves obtained by convolving the power distribution curves of light incident on the SLM with the spectral transmission (or reflectance) functions of pixels of the SLM.

In method 60A, step 64 comprises step 64A and optional step 64B. Step 64A comprises integrating the convolution of power spectral distribution curves for modulated light at pixels of the SLM with color matching functions. For example, step 64A may comprise determining XYZ tristimulus values by integrating the convolution of power spectral distribution curves for modulated light with the CIE color matching functions. Optional step 64B comprises converting the modeled pixel values to the display video color space. Step 64B may comprise, for example, converting pixel values expressed in the XYZ color space to the color space of the video data input of the target display (e.g., an RGB color space, such as the sRGB (ITU-R BT.709) color space, or the like).

In some embodiments, display conformer 44 is configured to generate display video data 50 by identifying pixels which are, or are likely to be, outside the fidelity range of a target display, modeling the display of at least some of these identified pixels by the target display, using the pixel values determined by the modeling in display video data 50, and using the pixel values of input data 14A for at least some of the non-identified pixels in display video data 50. Advantageously, such embodiments may reduce the amount of modeling required.

Figure 6:
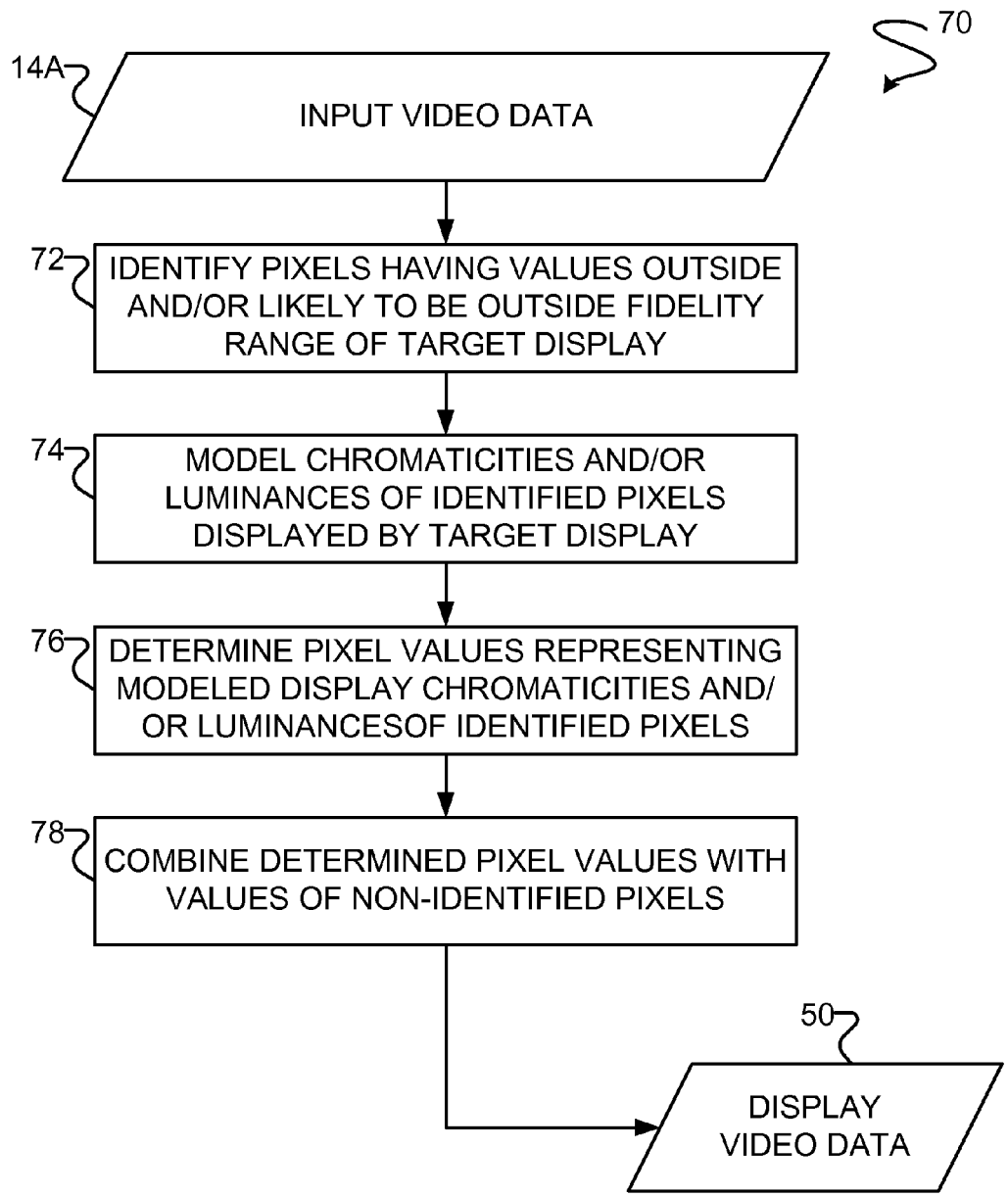
FIG. 6 is a flowchart of a method for conforming video data which a display conformer may implement.

FIG. 6 shows a flowchart of a method 70 which display conformer 44 may implement for generating display video data 50 corresponding to a target display having an illumination source and an SLM configured to modulate light from the illumination source. Step 72 of method 70 identifies pixels of input video data 14A having pixel values that are, or are likely to be, outside the fidelity range of the target display. Step 72 may comprise applying rules to identify pixels having values that violate (or might possibly violate) one or more display limitations of the target display (e.g., if the luminance of a pixel is greater than that target display's uncommonly attainable maximum luminance limit, then identify the pixel as out-of-fidelity range). An out-of-fidelity range rule may be embodied in a look-up table, a decision tree, a computable function, a combination thereof, the like.

In some embodiments, identification of pixels having values that are out of the fidelity range of the target display is performed in or with use of a hardware unit configured to compare pixel values in the input video data 14A to thresholds associated with a fidelity range of the target display.

Some rules may be applied to identify out-of-fidelity range pixels and/or suspect out-of-fidelity range pixels, on a content independent, spatially-independent basis. Examples of rules which may be applied on a content independent, spatially-independent basis include those which identify pixel values that specify:

luminances greater than the uncommonly attainable maximum luminance limit of the target display;

luminances greater than the globally attainable maximum luminance limit of the target display;

luminances less than the uncommonly attainable minimum luminance limit of the target display; and luminances less than the globally attainable minimum luminance limit of the target display; and chromaticities outside of the uncommonly attainable chromaticity gamut of the target display;

chromaticities outside of the globally-attainable chromaticity gamut of the target display;

chromaticities having a saturation that exceeds a globally-attainable saturation limit of the target display (e.g., chromaticities whose saturation cannot be accurately perceived due to desaturation of color primaries by reflected ambient light under particular ambient illumination conditions).

Some rules may be applied to identify out-of-fidelity range pixels and/or suspect out-of-fidelity range pixels, on a content independent, spatially-dependent basis. An example conformance rule which may be applied on a content independent, spatially-dependent basis identifies pixel values that specify luminances greater than the spatially-dependent luminance limit. Another example conformance rule which may be applied on a content independent basis identifies pixel values that specify chromaticities outside of a spatially-dependent chromaticity gamut.

Some conformance rules may be applied on a content dependent, spatially-independent basis. Examples of conformance rules which may be applied on a content dependent, spatially-independent basis include those which:

determine a global cumulative luminance for a scene, and identify pixel values that specify luminances greater than an uncommonly-attainable maximum luminance limit of the target display for the scene based on the global cumulative luminance (the maximum luminance achievable by the display pixel positioned to receive the most illumination from an illumination source when the limited power budget of the illumination source is exceeded by the demands of the global cumulative luminance of the scene);

determine a global cumulative luminance for a scene, and identify pixel values that specify luminances greater than a globally-attainable maximum luminance limit of the target display for the scene based on the global cumulative luminance (the maximum luminance achievable by the display pixel positioned to receive the least illumination from an illumination source when the limited power budget of the illumination source is exceeded by the demands of the global cumulative luminance of the scene);

determine global cumulative luminance for a scene, and identify pixel values that specify luminances less than an uncommonly attainable minimum luminance limit of the target display for the scene based on the global cumulative luminance (the minimum luminance achievable by the display pixel given an approximate background illumination produced by the illumination source(s) when driven for the global cumulative luminance);

identify closely-spaced (e.g., adjacent, within a radius of n pixels, etc.) pixels whose luminances exceed a maximum contrast ratio; and/or identify closely-spaced pixels whose chromaticity difference(s) exceed a maximum chromaticity difference (e.g., a pixel having a deeply saturated chromaticities that cannot be accurately rendered due to the presence of differently-colored light at the pixel that is required to display chromaticity of a nearby pixel).

Returning to the description of method 70, step 74 models the chromaticities and/or luminances with which a target display would display the pixels of input video data 14A identified in step 72. Step 74 is substantially similar to step 62 of method 60, differing in that step 74 operates on only the video pixels identified in step 72. Step 74 may comprise one or both of steps 62A and 62B of method 60B, modified to operate on only the video pixels identified in step 72. Where the target display would display substitute chromaticities and/or luminances for identified pixels, step 74 determines modeled display chromaticities and/or luminances that at least approximate the substitute chromaticities and/or luminances.

Step 76 determines pixel values representing the modeled display chromaticities and/or luminances. Step 76 is substantially similar to step 64 of method 60. Step 74 may comprise one or both of steps 64A and 64B of method 60B. Step 78 combines the determined pixel values for the identified pixels with the pixel values of non-identified pixels of input video data 14A to generate output display video data 50.

In some cases, the algorithms used by displays to control display elements make identifying out-of-fidelity range pixels using fully-determined rules impractical, undesirably slow and/or undesirably hardware intensive. For example, the algorithm by which a dual modulator display controls each of an array of individually controllable light emitters may take as input the pixel values of a large number of video pixels, making it impractical to specify a set of rules that accurately portrays content dependent limitations of the display. In some embodiments, display conformer 44 is configured to generate display video data 50 by applying a partial display model to input video data 14A to determine one or more content dependent fidelity limits of a target display, and then applying the determined fidelity limit(s) to identify pixels that are outside and/or are likely to be outside the fidelity range of the display.

Figure 7:
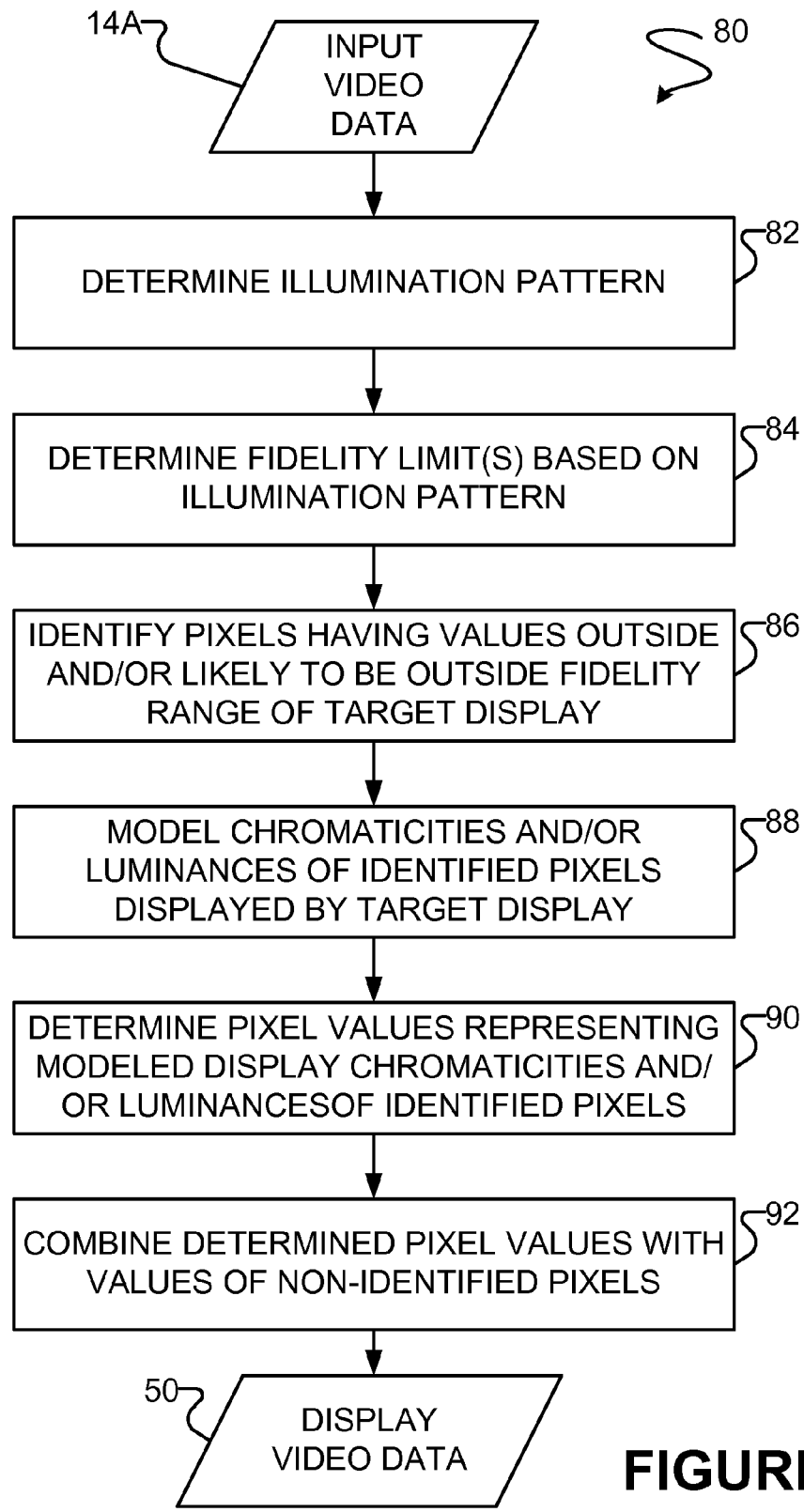
FIG. 7 is a flowchart of a method for conforming video data which a display conformer may implement.

FIG. 7 shows a flowchart of a method 80 which display conformer 44 may implement for generating display video data 50 corresponding to a target display having an illumination source and an SLM configured to modulate light from the illumination source. Step 82 of method 80 determines, at least approximately, an illumination pattern which the illumination source produce on the SLM in response to input video data 14A.

In some embodiments, step 82 comprises determining spectral power distribution curves indicative of light incident at pixels of the SLM, such as is done in step 62A. Step 82 may comprise determining a plurality of different illumination patterns corresponding to different color primaries (e.g., illumination patterns made up of power spectral distribution curves corresponding to each of a plurality of color primaries). As with step 62A, step 82 may comprise additively combining spectral power distribution curves indicative of light from different light emitters, and may comprise determining an illumination pattern for the SLM at a spatial resolution that is less than the spatial resolution of the SLM.

In some embodiments, step 82 comprises applying a low-pass filter to input video data 14A to obtain pixel values indicative of light incident at pixels of the SLM. In some such embodiments, step 82 may comprise color filtering input video data 14A either before or after the low-pass filter is applied to obtain a plurality of illumination patterns corresponding to different color primaries.

Step 84 determines one or more content dependent fidelity limits for pixels of the target display based on the illumination pattern determined in step 82. For example, step 84 may comprise determining a limit on the luminance which can be produced at a pixel of the target display based on the determined illumination at the pixel and the spectral absorption profile and light transmission range of the SLM at the pixel. For another example, step 84 may comprise determining a limit on the chromaticity gamut which can be produced at a pixel of the target display based on the determined illumination at the pixel and the light transmission range of the SLM at the pixel. A fidelity limit determined in step 84 may be spatially dependent or spatially independent. For example, step 84 may comprise determining globally attainable and/or uncommonly attainable display limits.

Step 86 identifies pixels of input video data 14A having pixel values that are outside and/or are likely to be outside the fidelity range of the target display by applying rules based on the fidelity limit(s) determined in step 84.

Step 88 models the chromaticities and/or luminances with which a target display would display the identified video pixels of input video data 14A. In some embodiments, step 88 comprises modeling the chromaticities and/or luminances with which the target display would display the pixels of input video data 14A based on the illumination map generated in step 82. For example, step 88 may comprise performing the operations of step 62B on the illumination map generated in step 82.

Step 90 determines pixel values representing the modeled display chromaticities and/or luminances. Step 90 is substantially similar to step 64 of method 60. Step 90 may comprise one or both of steps 64A and 64B of method 60B, for example.

Step 92 combines the pixel values for the identified pixels determined in step 90 with the pixel values of non-identified pixels of input video data 14A to generate output display video data 50.

In some embodiments, pixel values representing the chromaticities and/or luminances with which a target display would display video pixels of input video data 14A are modeled using computable functions (e.g., mapping functions) that depend on fidelity limits of (e.g., determined for, assumed for, etc.) the target display. For example, a model may determine pixel values representing the chromaticities and/or luminances with which a target display would display video pixels of input video data 14A by clipping pixel values to one or more fidelity limits of the target display. For another example, model may determine pixel values representing the chromaticities and/or luminances with which a target display would display video pixels of input video data 14A by range mapping a first range of pixel values that includes pixel values representing chromaticities and/or luminances which exceed a fidelity limit to a second range pixels values that does not include pixel values representing chromaticities and/or luminances that exceed the fidelity limit. In some embodiments, fidelity limits determined in step 84 are input to models of this sort.

Models and/or rules applied by display conformer 44 may be specified in any convenient color space. For example, in some embodiments it is convenient for the models and/or rules applied by display conformer 44 to be specified in an RGB color space, since RGB color spaces are typical of some target displays and the display limitations of such target displays are naturally expressed in RGB color spaces. In some embodiments, it is convenient for display conformer 44 to apply models and/or display rules specified in the particular device-specific color space of the target display.

Returning to FIG. 3, the models and/or rules applied by display conformer 44 may be configurable according to display conformance parameters 52. That is, display conformer 44 may be configured to implement a particular pixel modification scheme according to display conformance parameters 52. For instance, display conformer 44 may be configured to implement a pixel modification scheme specific to a particular target display. Display conformance parameters 52 may include fully-specified display models; parameterized display models; display properties that may be applied as input parameters to parameterized display models; rules and/or fidelity limits useful for identifying pixels that are, or are likely to be, outside the fidelity range of a particular display or display pixel; and the like, for example.

Display conformance parameters 52 may be obtained from a library of conformance parameters. For example, in some embodiments, color grading tool 40 comprises or has access to a data store containing a library 58 of display conformance parameters and a control (not shown) operable by a user to obtain display conformance parameters to from the library. Display conformance parameters 52 may be provided to color grading tool 40 from an external source, such as user input, a display attached to color grading tool 40 (e.g., a display used by a color-grader in color grading), or the like. For example, color grading tool 40 may comprise a display conformance parameter input 59 for receiving input display conformance parameters 52 from an external source. In some embodiments, color grading tool 40 is configured to receive input display conformance parameters 52 from an external source and to store the received input display conformance parameters 52 in display conformance parameter library 58.

In some embodiments, display conformance parameters 52 correspond to ambient illumination conditions that may affect the ability of a color-grader to accurately perceive images displayed by a color grading display. Consider for instance that video content may be color-graded for viewing under particular ambient illumination conditions. Such color-grading may be performed by a color-grader viewing video content under ambient illumination conditions that match the particular intended ambient illumination conditions. It may occur that the ambient illumination conditions under which the color-grader views video content may prevent the color-grader from perceiving some displayed pixels accurately. For example, high levels of ambient illumination may affect the ability of a color-grader to accurately perceive deep blacks (e.g., deep blacks may appear lighter due to screen reflection), which may cause the color-grader to fail to perceive differences between different black levels. For another example, high levels of ambient illumination may affect the ability of a color-grader to accurately perceive deeply saturated color (e.g., due to desaturation of color primaries caused by screen reflection), which may cause the color-grader to fail to perceive overly saturated colors (e.g., colors that look unnatural or cartoonish). Where ambient illumination conditions prevent the color-grader from perceiving some displayed pixels accurately, color-graded video data 46 may contain pixel values that result in undesirable visual artefacts (e.g., low level noise, over-saturated colors) when color-graded video data 46 is viewed under conditions of ambient illumination that are different from the intended ambient illumination.

Display conformance parameters 52 may be provided to display conformer 44 so that display conformer 44 is operable to reduce or eliminate pixel values characteristic of undesirable visual artefacts which may be masked by ambient illumination conditions. For example, display conformer 44 may be configured to apply a display model that increases the luminance of pixels whose luminance are below an uncommonly attainable minimum luminance limit specified by display parameters 52. For another example, display conformer 44 may be configured to apply a display model that desaturates colors that exceed an uncommonly attainable color saturation limit specified by display parameters 52.

Display conformer 44 may be configured to activate an optional adjustment indicator 54 when color-graded video data 46 differs from display video data 50 (e.g., when display conformer 44 modifies at least one pixel of color-graded video data 46). Adjustment indicator 54 may comprise a signal or data value, for example. Adjustment indicator 54 may be specific to individual pixels of video data, groups of pixels of video data (e.g., regions of a video frame), individual video frames of video data, groups of frames of video data (e.g., frames constituting a scene), and/or an entire work (e.g., all frames of a movie or other program). A user or other element of a system comprising color grading tool 40 may determine whether (or not) (and, optionally, how much of) display video data 50 differs from color-graded video data 46 based on adjustment indicator 54.

In some embodiments, display conformer 44 is configured to embed adjustment indicator 54 in display video data 50 (e.g., as metadata, as an image overlay, etc.). In some embodiments, adjustment indicator 54 is communicated via a side channel (e.g., via an ethernet port, serial port, or the like). In some embodiments, apparatus (e.g., color grading tools) are configured to receive adjustment indicator 54 and display a visual indication (e.g., on a display used to display the working video data of color grading tool 40) to indicate whether (or not) (and, optionally, how much of and/or what parts of) display video data 50 differs from color-graded video data 46. For example, a color grading tool could provide a visual indication derived from adjustment indicator 54 that visually indicates the regions of a video frame that contain pixel values outside the color gamut of the target display (e.g., such as by a highlighting of these areas).

In some embodiments, adjustment indicator 54 comprises a map or other indication of which pixels of color-graded video data 46 have been modified by display conformer 44. In some embodiments, adjustment indicator 54 comprises an indication of the reason(s) for which the modified pixels in display video data 52 were modified (e.g., original pixel value(s) specified a point outside of a content independent uncommonly attainable color gamut specified by display conformance parameters 52, original pixel value(s) specified luminance greater than a content independent uncommonly attainable maximum luminance, etc.). In some embodiments, adjustment indicator 54 comprises an indication of how the modified pixels in display video data 50 differ from the corresponding pixels of input video data 14A.

In some embodiments, display conformer 44 is configured to provide applied display conformance parameters 56. Applied display conformance parameters 56 may indicate minimum display capabilities (e.g., one or more fidelity limits) required of a display to accurately render display video data 50. Applied display conformance parameters 56 may specify, in whole or in part, a display model that display conformer 44 applied to color-graded video data 46 in generating display video data 50.

Display conformer 44 may be configured to establish an association between applied display conformance parameters 56 and display video data 50. For example, display conformer 44 may be configured to provide display video data 50 and applied display conformance parameters 56 indicative of the display properties required of a display to accurately display display video data 50 in a common container (e.g., in a common package, data structure, physical medium or the like) for approval, archiving, distribution and/or the like.

It will be appreciated than an association with display video data 50 is implicitly also an association with every video pixel of display video data 50.

Display conformer 44 may be configured to establish an association between applied display conformance parameters 56 and color-graded video data 46. For example, display conformer 44 may be configured to provide color-graded video data 46 and applied display conformance parameters 56 specifying a display model, which when applied to color-graded video data 46 obtains display video data 50, in a common container for approval, archiving, distribution and/or the like.

Display conformer 44 may be configured to establish an association between video data (e.g., display video data 50 or color-graded video data 46) and an applied display conformance parameter 56 by storing in a data store an association between the video data and applied conformance parameter 56. For instance, display conformer 44 may be configured to store a look-up entry in a look-up table stored in a data store, which entry associates video data with applied display conformance parameters 56.

Figure 8:
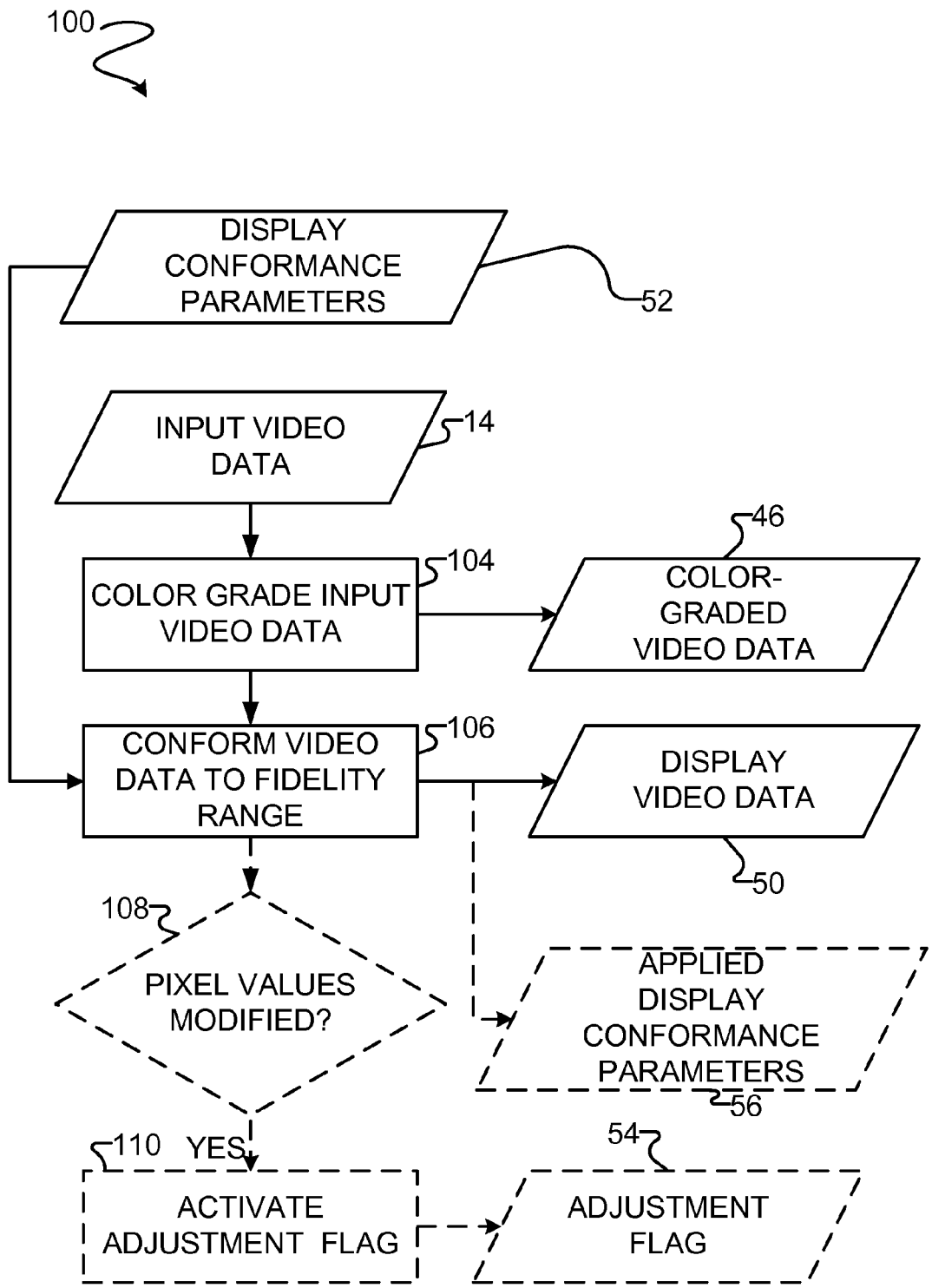
FIG. 8 is a flow chart of a method which a color grading tool may implement.

FIG. 8 is a flow chart of a method 100 according to an example embodiment. Color grading tool 40 may be configured to perform one or more steps of method 100. In step 104, input video data 14 is color-graded to generate color-graded video data 46. Color grading adjustment module 42 may be configured to perform step 104.

In step 106, color-graded video data produced in step 104 is conformed according to display conformance parameters 52 to yield display video data 50. Display conformer 44 may be configured to perform step 106. Step 106 may comprise applying a model, and, optionally, one or more rules, such as is described above, for example. Step 106 may comprise one or more steps of any of methods 60, 70, 80 and/or 90. In some embodiments, step 106 comprises generating optional applied display conformance parameters 56. In some embodiments, step 106 is performed in parallel with step 104 (e.g., steps 106 and 104 may be combined such that display video data is generated in real-time, such as for viewing by a color-grader during color grading).

In some embodiments, method 100 comprises optional steps 108 and 110. Step 108 determines whether pixels of color-graded video data 46 generated in step 104 were modified in step 106. Step 108 may comprise determining whether pixels of display video data 50 differ from corresponding pixels of color-graded video data 46 generated in step 104. In some embodiments, step 106 comprises maintaining a record of whether any pixels of color-graded video data 46 generated in step 104 were modified (e.g., identified as being outside or likely to be outside of the fidelity range of the target display, and modified to reflect modeled pixel values), and step 108 comprises checking this record. If step 108 determines that one or more pixels of color-graded video data 46 generated in step 104 were modified in step 106 (step 108, YES), then in step 110 an adjustment indicator is activated.

In some embodiments, method 100 comprises an optional step (not shown) of pre-conforming input video data before step 104. Pre-conforming input video data 14 prior to step 104 may be advantageous where input video data 14 contains many pixels outside the fidelity range of a display used to display working video data during color grading (e.g., computer generated input video data). Pre-conforming input video data may comprise applying a model, and, optionally, one or more rules, such as is described above, for example. Pre-conforming input video data may comprise one or more steps of any of methods 60, 70, 80 and/or 90. In some embodiments, method 100 comprises pre-conforming input video data in advance of color grading, and conforming input video data in real-time during color grading (e.g., performing steps 104 and 106 in tandem so that working display video data may be viewed by a color grader during color grading).

Figure 9:
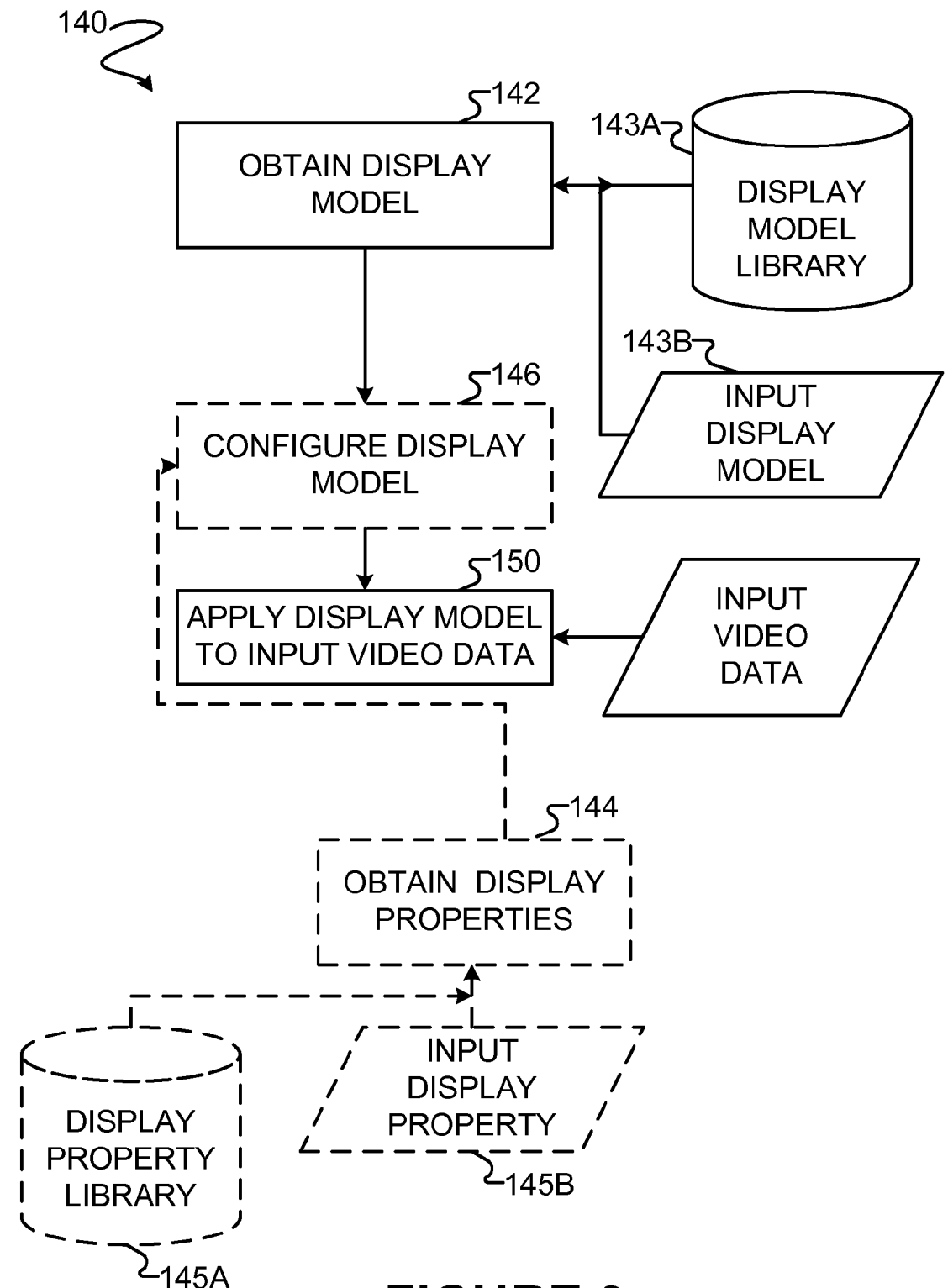
FIG. 9 is a flowchart of a method for configuring a display model which a display conformer may implement.

FIG. 9 is a flow chart of a method 140 for configuring a display model for use in display conforming operations according to an example embodiment. Display conformer 44 may be configured to perform one or more steps of method 120. Steps 62, 74 and 88 of methods 60, 70 and 80, respectively, may comprise one or more steps of method 140.

In step 142 a display model is obtained. Step 142 may comprise selecting a display model from display model library 143A. Step 142 may comprise obtaining an input display model 143B (e.g., from an external input, such as from a user, a display, or the like). Step 142 may comprise obtaining a display model corresponding to a target display.

The display model obtained in step 142 may or may not be fully specified (e.g., the display model obtained in step 142 may be parameterized). Where a display model obtained in step 132 is not fully specified, method 140 may comprise optional steps 144 and 146. In step 144, one or more display properties are obtained. Display properties obtained in step 144 may correspond to a target display. Display properties obtained in step 144 may comprise display capabilities and/or display limitations of a target display, for example. Step 144 may comprise selecting one or more display properties from display property library 145A. Step 144 may comprise obtaining one or more input display properties 145B (e.g., from an external input, such as from a user, a display, or the like). In step 146, the display model obtained in step 142 is configured according to the display properties obtained in step 144. Step 146 may comprise configuring a display model obtained in step 142 for a target display.

In some embodiments, step 146 comprises performing a color space transform on the display model obtained in step 142 and/or arguments thereto. For example, where the display model and/or arguments thereto are specified in a first color space and the video data to which the model is to be applied is specified in a second color space, step 146 may comprise transforming the display model and/or arguments thereto from the first color space to the second color space.

In step 150, the display model configured in step 146 is applied to input video data to yield modeled video data. In some embodiments, step 150 comprises performing a color space transform on the input video data. For example, where the display model and/or arguments thereto are specified in a first color space and the video data to which the model is to be applied is specified in a second color space, step 150 may comprise transforming the input video data from the second color space to the first color space. Pixel values in modeled video data produced in step 150 may be used in display video data generated by display conformer 44.

Figure 10:
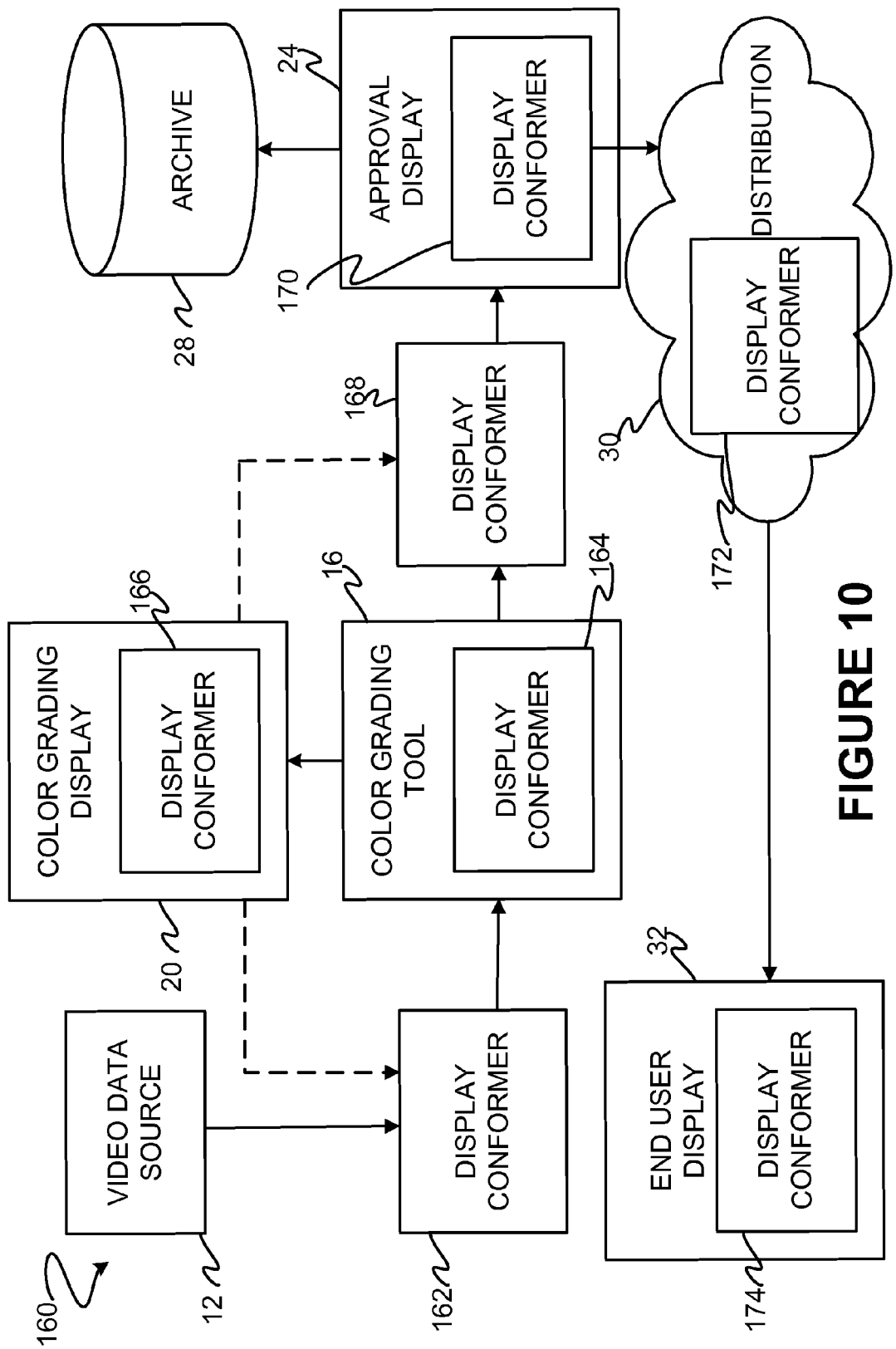
FIG. 10 is a block diagram of a video-post production work flow according to an example embodiment.

FIG. 10 is a flow chart illustrating an example video post-production and distribution work-flow 160 according to an example embodiment. Some features of video post-production and distribution work-flow 160 are shown in FIG. 1 using the same reference numerals, and will not be described in detail again. FIG. 11 shows example places in work-flow 160 where a display conformer may be situated to conform video data. In some embodiments, a video post-production work-flow comprises one or more display conformers at one or more of the places where a display conformer is situated in work-flow 160. Display conformers in work-flow 160 may have some or all of the features of display conformers disclosed herein and be configured to perform some or all steps of methods described herein. In some embodiments, one or more steps of method 100 may be performed as part of a work-flow that comprises one or more display conformers at one or more of the places where a display conformer is situated in work-flow 160.

In video post-production work-flow 160, a first display conformer 162 is situated to conform input video data from video data source 12 before the input video data is provided to color grading tool 16. In some embodiments, display conformer 162 is configured to conform input video data for display on a target display. For example, display conformer 162 may be configured to conform input video data to a fidelity range of a display on which the working video data of color grading tool 16 is to be viewed by a color grader (e.g., color grading display 20), a person responsible for approving color-graded video data (e.g., approval display 24), an end-user display (e.g., end-user display 32), or the like. In some embodiments, display conformer 166 is configured to obtain display conformance parameters (e.g., display properties) from display 20 or another display.

A second display conformer 164 is integrated with color grading tool 16. In some embodiments, display conformer 164 is configured to conform color-graded video data of color grading tool 16 (such as working video data, for example) for a display on which the working color grading video data is viewed by a color grader during color-grading (e.g., color grading display 20). Where this is done, color grading display 20 may be able to display video data generated by display conformer 164 accurately or substantially accurately. Display conformer 164 may provide conformed video content for subsequent use in work-flow 160.

In some embodiments, display conformer 164 is configured to obtain display conformance parameters (e.g., display properties) from display 20. In some embodiments, differences between working video data of color grading tool 16 and video data generated by display conformer 164 may be indicated by an adjustment indicator generated by display conformer 164, which indicator is provided to display 20 for display (e.g., so as to be viewable by a color-grader).

A third display conformer 166 is integrated with color grading display 20. In some embodiments, display conformer 166 is configured to conform video data input to display 20 to color grading display 20. For example, display conformer 166 may be configured to conform color-graded video data to a fidelity range of color grading display 20. Where this is done, color grading display 20 may be able to accurately display video data generated by display conformer 166.

In some embodiments, display conformer 166 comprises a data store containing display conformance parameters for conforming video data to display 20 (e.g., display properties of display 20). In some embodiments, display conformer 166 is configured to obtain display conformance parameters (e.g., display properties) from display 20. In some embodiments, differences between video data displayed on color grading display 20 and video data input to display 20 from color grading tool 16 may be indicated on display 20 by an adjustment indicator generated by display conformer 166.

A fourth display conformer 168 is situated to conform color-graded video data output from color grading tool 16 before the color-graded video data is provided to approval display 24. In some embodiments, display conformer 168 is configured to conform input color-graded video data from color grading tool 16 for a display on which the color-graded video content was viewed by a color grader during color-grading (e.g., color grading display 20). Where this is done, the appearance of video data generated by display conformer 168 when displayed by display 24 may be the same, or substantially the same, as the appearance of video data viewed by the color-grader. In some embodiments, display conformer 166 is configured to obtain display conformance parameters (e.g., display properties) from a display on which the color-graded video content was viewed by a color grader during color-grading (e.g., color grading display 20).

In some embodiments, one or more of display conformers 162, 164, 166, and 168 may be configured to generate applied display conformance parameters which indicate display properties required of a display to accurately display video data conformed by the respective display conformer and/or specify, at least partially, display models and/or rules applied by the respective display conformer in generating conformed video data.

A fifth display conformer 170 is integrated with approval display 24. In some embodiments, display conformer 170 is configured to conform color-graded video data according to applied display conformance parameters generated by one or more of display conformers 162, 164 and 166. Where this is done, the appearance of video data generated by display conformer 170 when displayed by display 24 may be the same, or substantially the same, as the appearance of video data viewed by the color-grader.

A sixth display conformer 172 is integrated with distribution network 30. In some embodiments, display conformer 172 is configured to conform video data to be distributed by distribution network 30 according to applied display conformance parameters generated by one or more of display conformers 162, 164 and 166. Where this is done, the appearance of video data generated by display conformer 172 when displayed by a display to which such video data is distributed via network 30 (e.g., an end-user display 32) may be the same, or substantially the same, as the appearance of the video data viewed by the color-grader.

A seventh display conformer 174 is integrated with end-user display 32. In some embodiments, display conformer 174 is configured to conform video data input to end-user display 32 to according to applied display conformance parameters generated by one or more of display conformers 162, 164 and 166. Where this is done, the appearance of video data generated by display conformer 174 when displayed by end-user display 32 may be the same, or substantially the same, as the appearance of video data viewed by the color-grader.

Systems, modules and components described herein may comprise software, firmware, hardware, or any combination(s) of software, firmware, or hardware suitable for the purposes described herein. Software and other modules may reside on servers, workstations, personal computers, computerized tablets, PDAs, color-grading tools, video projectors, audio-visual receivers, displays (such as televisions) and other devices suitable for the purposes described herein. In other words, the software and other modules described herein may be executed by a general-purpose computer, e.g., a server computer, wireless device or personal computer. Those skilled in the relevant art will appreciate that aspects of the system can be practiced with other communications, data processing, or computer system configurations, including: Internet appliances, hand-held devices (including personal digital assistants (PDAs)), wearable computers, all manner of cellular or mobile phones, multi-processor systems, micro-processor-based or programmable consumer electronics (e.g., video projectors, audio-visual receivers, displays, such as televisions, and the like), set-top boxes, color-grading tools, network PCs, mini-computers, mainframe computers, and the like. Indeed, the terms "computer," "server," "host," "host system," and the like may generally be used interchangeably herein, and refer to any of the above devices and systems, as well as any data processor. Furthermore, aspects of the system can be embodied in a special purpose computer or data processor that is specifically programmed, configured, or constructed to perform one or more of the computer-executable instructions explained in detail herein.

Software and other modules may be accessible via local memory, via a network, via a browser or other application in an ASP context, or via other means suitable for the purposes described herein. Examples of the technology can also be practiced in distributed computing environments where tasks or modules are performed by remote processing devices, which are linked through a communications network, such as a Local Area Network (LAN), Wide Area Network (WAN), or the Internet. In a distributed computing environment, program modules may be located in both local and remote memory storage devices. Data structures (e.g., containers) described herein may comprise computer files, variables, programming arrays, programming structures, or any electronic information storage schemes or methods, or any combinations thereof, suitable for the purposes described herein.

Image processing and processing steps as described above may be performed in hardware, software or suitable combinations of hardware and software. For example, such image processing may be performed by a data processor (such as one or more microprocessors, graphics processors, digital signal processors or the like) executing software and/or firmware instructions which cause the data processor to implement methods as described herein. Such methods may also be performed by logic circuits which may be hard configured or configurable (such as, for example logic circuits provided by a field programmable gate array "FPGA").

Certain implementations of the invention comprise computer processors which execute software instructions which cause the processors to perform a method of the invention. For example, one or more processors in a video workstation, set top box, display, video projector, transcoder or the like may implement methods as described herein by executing software instructions in a program memory accessible to the processors.

The invention may also be provided in the form of a program product. The program product may comprise any non-transitory medium which carries a set of computer-readable signals comprising instructions which, when executed by a data processor, cause the data processor to execute a method of the invention. Program products according to the invention may be in any of a wide variety of forms. The program product may comprise, for example, media such as magnetic data storage media including floppy diskettes, hard disk drives, optical data storage media including CD ROMs, DVDs, electronic data storage media including ROMs, flash RAM, hardwired or preprogrammed chips (e.g., EEPROM semiconductor chips), nanotechnology memory, or the like. The computer-readable signals on the program product may optionally be compressed or encrypted. Computer instructions, data structures, and other data used in the practice of the technology may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme).

Where a component (e.g. a display conformer, color grading adjustment module, display model, software module, processor, assembly, device, circuit, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of examples of the technology is not intended to be exhaustive or to limit the system to the precise form disclosed above. While specific examples of, and examples for, the system are described above for illustrative purposes, various equivalent modifications are possible within the scope of the system, as those skilled in the relevant art will recognize. For example, while processes or blocks are presented in a given order, alternative examples may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times.

The teachings of the technology provided herein can be applied to other systems, not necessarily the system described above. The elements and acts of the various examples described above can be combined to provide further examples. Aspects of the system can be modified, if necessary, to employ the systems, functions, and concepts of the various references described above to provide yet further examples of the technology.

These and other changes can be made to the system in light of the above Detailed Description. While the above description describes certain examples of the system, and describes the best mode contemplated, no matter how detailed the above appears in text, the system can be practiced in many ways. Details of the system and method for classifying and transferring information may vary considerably in its implementation details, while still being encompassed by the system disclosed herein. As noted above, particular terminology used when describing certain features or aspects of the system should not be taken to imply that the terminology is being redefined herein to be restricted to any specific characteristics, features, or aspects of the system with which that terminology is associated. In general, the terms used in the following claims should not be construed to limit the system to the specific examples disclosed in the specification, unless the above Detailed Description section explicitly and restrictively defines such terms. Accordingly, the actual scope of the system encompasses not only the disclosed examples, but also all equivalent ways of practicing or implementing the technology under the claims.

From the foregoing, it will be appreciated that specific examples of systems and methods have been described herein for purposes of illustration, but that various modifications may be made without deviating from the spirit and scope of the invention. Those skilled in the art will appreciate that certain features of embodiments described herein may be used in combination with features of other embodiments described herein, and that embodiments described herein may be practised or implemented without all of the features ascribed to them herein. Such variations on described embodiments that would be apparent to the skilled addressee, including variations comprising mixing and matching of features from different embodiments, are within the scope of this invention.

As will be apparent to those skilled in the art in the light of the foregoing disclosure, many alterations, modifications, additions and permutations are possible in the practice of this invention without departing from the spirit or scope thereof. The embodiments described herein are only examples. Other example embodiments may be obtained, without limitation, by combining features of the disclosed embodiments. It is therefore intended that the following appended claims and claims hereafter introduced are interpreted to include all such alterations, modifications, permutations, additions, combinations and sub combinations as are within their true spirit and scope.

What is claimed is:

1. A color grading tool for producing color-graded display video data from input video data, the color grading tool comprising:
    a color grading adjustment module operable to color-grade the input video data to yield color-graded video data while displaying the color-graded video data on a color-grading display; and
    a display conformer configured to modify the color-graded video data for display on a target display and having a greater fidelity range than the color-grading display, by:
    modeling the display of all or part of the color-graded video data on the color-grading display by a computational display model of the target display to determine one or more modified pixel values that represent the appearance of one or more corresponding pixels of the color-graded video data when displayed on the color-grading display;
    identifying at least one pixel having values outside the fidelity range of the color-grading display; and
    modifying the color-graded video data by replacing such pixel values of one or more identified pixels of the color-graded video data for which the identified pixel values are outside a fidelity range of the color-grading display with the corresponding ones of the modified pixel values, wherein the modified pixel values include substitute chromaticities and/or luminances related to the target display, and wherein
    the display conformer is configured to apply the input video data to the computational display model of the target display, the computational display model configured to determine said substitute chromaticities and/or luminances with which the target display would display such pixels of the input video data which are outside said fidelity range of the color-grading display.

2. The color grading tool according to claim 1, wherein the target display comprises an illumination source and spatial light modulator configured to modulate light emitted by the illumination source, and the display conformer is further configured to:
    determine a pattern of illumination produced on the spatial light modulator by the illumination source in response to the video data; and
    determine a fidelity limit of the fidelity range of the target display based on the pattern of illumination,
    wherein the pixels values to be replaced are identified based on the determined fidelity limit.

3. The color grading tool according to claim 2, wherein the display conformer is configured to determine the fidelity limit by determining a chromaticity space that can be achieved by the spatial light modulator modulating the determined illumination at one or more pixels of the spatial light modulator.

4. The color grading tool according to claim 2, wherein the display conformer is configured to determine the fidelity limit by determining a luminance range that can be achieved by the spatial light modulator modulating the illumination at one or more pixels of the spatial light modulator.

5. The color grading tool according to claim 3, wherein the display conformer is configured to determine the fidelity limit by determining a luminance range that can be achieved by the spatial light modulator modulating the illumination at one or more pixels of the spatial light modulator.

6. A method for managing display limitations related to a target display in the distribution of color-graded video data, the color-graded video data viewed on a color-grading display during color grading thereof, the color-grading display having a smaller fidelity range than the target display, the method comprising:
    obtaining the color-graded video data;
    generating display video data related to the target display by modifying the color-graded video data, the modifying comprising:
    modeling the display of all or part of the color-graded video data on the color-grading display to determine one or more modified pixel values representing the appearance of one or more corresponding pixels of the color-graded video data when displayed by the color-grading display;
    identifying at least one pixel having values outside the fidelity range of the color-grading display; and
    in the color-graded video data, replacing pixel values of one or more identified pixels of the color-graded video data for which the pixel values are outside the fidelity range of the color-grading display with substitute pixel values including substitute chromaticities and/or luminances with which the target display would display such pixels of the input video data which are outside the fidelity range of the color-grading display; and
    making the display video data available to an end-user, wherein said substitute chromaticities and/or luminances are determined by a computational display model of the target device.

7. A system configured to execute the method according to claim 6.

8. A color grading tool for producing color-graded display video data from input video data, the color grading tool comprising:
    a color grading adjustment module operable to color-grade the input video data to yield color-graded video data while displaying the color-graded video data on a color-grading display; and a display conformer configured to modify the color-graded video data for display on a target display and having a greater fidelity range than the color-grading display, by:

modeling the display of all or part of the color-graded video data on the color-grading display by a computational display model of the target display to determine one or more modified pixel values that represent the appearance of one or more corresponding pixels of the color-graded video data when displayed on the color-grading display;

identifying at least one pixel having values outside the fidelity range of the color-grading display; and modifying the color-graded video data by replacing such pixel values of one or more identified pixels of the color-graded video data for which the identified pixel values are outside a fidelity range of the color-grading display with the corresponding ones of the modified pixel values, wherein the modified pixel values include substitute chromaticities and/or luminances related to the target display, and wherein the display conformer is configured to apply the input video data to the computational display model of the target display, the computational display model configured to determine said substitute chromaticities and/or luminances with which the target display would display such pixels of the input video data which are outside said fidelity range of the color-grading display, wherein the target display comprises an illumination source and spatial light modulator configured to modulate light emitted by the illumination source, and the display conformer is further configured to:

determine a pattern of illumination produced on the spatial light modulator by the illumination source in response to the video data; and determine a fidelity limit of the fidelity range of the target display based on the pattern of illumination, wherein the pixels values to be replaced are identified based on the determined fidelity limit.

* * * * *